United States Patent
Beall et al.

(10) Patent No.: US 6,465,380 B1
(45) Date of Patent: Oct. 15, 2002

(54) ATHERMAL OPTICAL DEVICE

(75) Inventors: George H. Beall, Big Flats; Kenneth Chyung; Joseph E. Pierson, both of Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/693,446

(22) Filed: Oct. 20, 2000

Related U.S. Application Data

(62) Division of application No. 09/344,163, filed on Jun. 24, 1999, now Pat. No. 6,209,352, which is a division of application No. 09/203,166, filed on Dec. 1, 1998
(60) Provisional application No. 60/010,058, filed on Jan. 16, 1996.

(51) Int. Cl.[7] ............................................... C03C 10/12
(52) U.S. Cl. ........................................................ 501/7
(58) Field of Search .............................................. 501/7

(56) References Cited

U.S. PATENT DOCUMENTS

| | | | | |
|---|---|---|---|---|
| 4,042,403 A | * | 8/1977 | Reade ............................. | 501/7 |
| 4,209,229 A | * | 6/1980 | Ritler ........................ | 350/96.34 |
| 4,397,670 A | * | 8/1983 | Beall ............................... | 501/3 |
| 5,186,729 A | * | 2/1993 | Brown et al. ................... | 501/7 |

* cited by examiner

*Primary Examiner*—Karl Group
(74) *Attorney, Agent, or Firm*—Svetlana Short

(57) ABSTRACT

An athermal optical device and a method for producing the device, such as an athermal optical fiber reflective grating, are described. The athermal optical fiber reflective grating device comprises a negative expansion substrate, an optical fiber mounted on the substrate surface, and a grating defined in the optical fiber. The method for producing the athermal optical fiber reflective grating device comprises providing a negative expansion substrate, mounting an optical fiber with at least one reflective grating defined therein onto the substrate upper surface, and affixing the optical fiber to the substrate at at least two spaced apart locations.

4 Claims, 15 Drawing Sheets

ATHERMAL OPTICAL DEVICE

RELATED APPLICATIONS

This application is a Divisional of U.S. patent Ser. No. 09/344,163 filed Jun. 24 1998 allowed divisional U.S. Pat. No. 6,209,352, granted Apr. 3, 2001 entitled A THERMAL OPTICAL DEVICE, which divisional application claims the benefit of a prior divisional application Ser. No. 09/203,166, filed Dec. 1, 1998, entitled A THERMAL OPTICAL DEVICE, which divisional application claims the benefit of parent U.S. Pat. No. 6,087,280, granted Jul. 11, 2000, entitled ATHERMAL OPTICAL DEVICE, which parent claims the benefit of Provisional application Ser. No. 60/010,058, filed Jan. 16, 1996. All of which are hereby incorporated by reference.

FIELD OF THE INVENTION

This invention relates to a temperature compensated, athermal optical device and, in particular, to an optical fiber reflective grating device incorporating a negative expansion beta-eucryptite substrate to produce an athermal optical fiber reflective grating device, and to a method of producing the athermal optical fiber reflective grating device.

BACKGROUND OF THE INVENTION

Index of refraction changes induced by UV light are useful in producing frequency of the light reflected by such an optical fiber with the incorporated grating filter is related to the spacing of the grating which varies either with the strain to which the grating region is subjected, or with the temperature of the grating region, in a clearly defined relationship, which is substantially linear to either one of these parameters.

For a uniform grating with spacing L, in a fiber with an effective index of complex, narrow-band optical components such as filters and channel add/drop devices. These devices can be an important part of multiple-wavelength telecommunication systems. The prototypical photosensitive device is a reflective grating (or Bragg grating), which reflects light over a narrow wavelength band. Typically, these devices have channel spacings measured in nanometers.

There are already known various constructions of optical filters, among them such which utilize the Bragg effect for wavelength selective filtering. U.S. Pat. No. 4,725,110 discloses one method for constructing a filter which involves imprinting at least one periodic grating in the core of the optical fiber by exposing the core through the cladding to the interference pattern of two ultraviolet beams that are directed against the optical fiber at two angles relative to the fiber axis that complement each other to 180°. This results in a reflective grating which is oriented normal to the fiber axis. There fraction n and expansion a, the variation of center reflective wavelength, $l_r$ is given by $$dl_r/dT=2L[dn/dT+na]$$

In silica and germania-silica fiber reflective gratings the variation in center wavelength is dominated by the first term in the brackets, the change of index of refraction with temperature. The expansion term contributes less than ten percent of the total variability. $dl_r/dT$ is typically 0.01 nm/°C. for a grating with a peak reflectance at 1550 nm.

One practical difficulty in the use of these gratings is their variation with temperature. In as much as the frequency of the light reflected by the fiber grating varies with the temperature of the grating region this basic filter cannot be used in applications where the reflected light frequency is to be independent of temperature. Methods of athermalizing the fiber reflective grating would increase the applications for such gratings.

One method of athermalizing a fiber reflective grating is to thermally control the environment of the grating with an actively controlled thermal stabilization system. Such thermal stabilization is costly to implement and power, and its complexity leads to reliability concerns.

A second athermalization approach is to create a negative expansion which compensates the dn/dT. Devices which employ materials with dissimilar positive thermal expansions to achieve the required negative expansion are known.

U.S. Pat. No. 5,042,898 discloses a temperature compensated, embedded grating, optical waveguide light filtering device having an optical fiber grating. Each end of the fiber is attached to a different one of two compensating members made of materials with such coefficients of thermal expansion relative to one another and to that of the fiber material as to apply to the fiber longitudinal strains, the magnitude of which varies with temperature in such a manner that the changes in the longitudinal strains substantially compensate for these attributable to the changes in the temperature of the grating.

Yoffe, G. W. et al in "Temperature-Compensated Optical-Fiber Bragg Gratings" OFC'95 Technical Digest, paper WI4, discloses a device with a mechanical arrangement of metals with dissimilar thermal expansions which causes the distance between the mounting points of an optical fiber to decrease as the temperature rises and reduce the strain in a grating.

Such devices have several undesirable properties. First, fabricating a reliable union with the fiber is difficult in such devices. Second, the mechanical assembly and adjustment of such devices make them costly to fabricate. These systems also show hysteresis, which makes the performance degrade under repeated thermal cycling. Finally some of the approaches require that the grating, which can be several centimeters long, be suspended, making them incompatible with other requirements of passive devices such as insensitivity to mechanical shock and vibration.

Another method of incorporating negative expansion which may be envisaged is to provide a substrate for mounting the optical fiber grating thereon which is fabricated from material with an intrinsic negative coefficient of expansion.

U.S. Pat. No. 4,209,229 discloses lithium-alumina-silica type ceramic glasses, particularly those having stoichiometries, on a mole ratio basis, in the range of 1 $Li_2O$: 0.5–1.5 $Al_2O_3$: 3.0–4.5 $SiO_2$, which are particularly adapted for use as protective outer layers over fused silicas and other cladding materials for optical fiber waveguide members. When these lithium aluminosilicate glasses are cerammed, that is, heat treated to produce nucleated crystallizations, the dominant crystal phase developed is either beta-eucryptite or beta-quartz solid solution. Nucleating agents such as $TiO_2$ and $ZrO_2$ are used to initiate crystallization of the glass. The glasses produced in this manner have negative coefficients of expansion averaging about $-1.4\times10^{-7}$/°C. over the range of 0°--600° C. Thin layers of these lithium aluminosilicate glasses can be cerammed to develop fine-grained crystal phases by heat treating a coated filament at 700–1400° C. for a time not exceeding one minute. The cooled outer layer exerts a compressive stress on the coated fiber.

U.S. Pat. No. 5,426,714 disclose optical fiber couplers which utilize beta-eucryptite lithium aluminosilicates having a low or negative coefficient of thermal expansion as fillers for polymeric resins. The glass-ceramics were obtained by melting the composition in a platinum crucible at 1650° C. The glass was then drigaged, cerammed and ground to a powder. A beta-eucryptite composition of 15.56 wt. % $Li_2O$, 53.125 wt. % $Al_2O_3$, 31.305 wt. % $SiO_2$ having a negative coefficient of thermal expansion of $-86 \times 10^{-7}$° C. measured between −40° C. and +80° C. is disclosed (Col. 4, lines 24–28).

It is an object of this invention to provide a temperature compensated optical device which is an athermal device.

It is an object of this invention to provide a temperature compensated optical fiber reflective grating device which is an athermal device.

It is an object of this invention to provide a temperature compensated optical fiber reflective grating device which tolerates shock and vibration.

It is an object of this invention to provide a temperature compensated optical fiber reflective grating device which has a stable center wavelength.

It is an object of this invention to provide a temperature compensated optical fiber reflective grating device in which the grating region of the fiber is straight.

SUMMARY OF THE INVENTION

Briefly stated the invention provides a method for producing an athermal optical device comprising; providing a negative expansion substrate having an upper surface; mounting a thermally sensitive, positive expansion optical component onto the substrate upper surface and affixing the component to the substrate at at least two spaced apart locations.

In another aspect of the invention there is provided an athermal optical device comprising; a negative expansion substrate having an upper surface; a thermally sensitive, positive expansion optical component affixed to the substrate upper surface at at least two spaced apart locations.

In another aspect of the invention there is provided a method for producing an athermal optical fiber grating device comprising; providing a negative expansion substrate having an upper surface and first and second ends; mounting an optical fiber with at least one grating defined therein onto the substrate upper surface such that the grating lies between and at a distance from each end; and affixing the optical fiber to the substrate at at least two spaced apart locations.

In another aspect of the invention there is provided an athermal optical fiber grating device comprising; a negative expansion substrate having an upper surface and first and second ends; an optical fiber affixed to the substrate upper surface at at least two spaced apart locations; and a grating defined in the optical fiber between and at a distance from each end.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
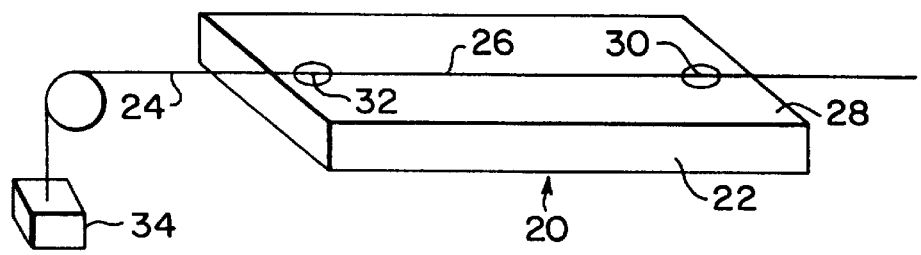
FIG. 1 is a schematic drawing of an embodiment of an athermal optical fiber grating device.

Thermally sensitive optical devices of the invention include optical waveguides, UV photo induced fiber gratings and optical fiber couplers. The optical fiber reflective gratings used in the device of this invention are well known to those familiar with the art, for example, UV photo induced gratings of the Bragg type.

In this invention, the athermalization approach taken is to create a negative expansion which compensates for the positive change in refractive index of the optical fiber with a change in temperature. The coefficient of expansion required is on the order of $-50 \times 10^{-7 \cdot \circ}$ C., or perhaps slightly higher because of stress-optic effects. In this approach, the fiber containing the grating is mounted, preferably under tension, on a substrate that imparts a negative thermal expansion to the fiber. Thus, as the temperature is increased, the tension is reduced, but the fiber is never put into compression (as this would be mechanically unstable).

The optical fiber, for example a germania-silica fiber, is affixed to a substrate with an intrinsic negative coefficient of expansion. The increase of the index of refraction of the fiber caused mostly by the thermal drift, is compensated by a negative mechanical expansion. The negative expansion is imparted by a substrate fabricated from a material based on a silica based glass-ceramic possessing an intrinsic negative coefficient of expansion. The negative expansion is obtained by inducing micro crystals in the glass-ceramic which undergo a reconstructive phase change on heating at high temperatures, for example about 1300° C., to produce a highly ordered beta-eucryptite (i.e. stuffed beta-quartz) structure.

A suitable material for the substrate, beta-eucryptite, has been identified which provides compensation over a wide temperature range, for example −40° to +85° C., which is mechanically robust against creep and shows minimal thermal hysteresis. In some applications an even wider range of temperatures may be tolerated. The beta-eucryptite material is based on a highly ordered lithium aluminosilicate glass-ceramic which is, in itself, a stuffed derivative of beta-quartz containing aluminum and lithium. Significant titania, for example >2 wt %, is also required to be present as a nucleating agent to induce crystallization of the solid solution in order to minimize grain size and reduce hysteresis due to inter granular micro cracking.

The beta-eucryptite solid solution of preference lies between stoichiometric $LiAlSiO_4$ ($Li_2O:Al_2O_3:2SiO_2=$ 1:1:2) and $Li_2Al_2Si_3O_{10}$($Li_2O:Al_2O_3:3SiO_2=1:1:3$), and the nucleating agents $TiO_2$ and, optionally, $ZrO_2$, are added in such a way as to produce accessory phases $Al_2TiO_5$ or $ZrTiO_4$ preferably the former, for the lowest thermal expansion coefficients.

This glass-ceramic has a true negative expansion micro crystalline phase, strongly along one axis, c-axis, mildly positive along the other, a-axis and is mechanically stable over a wide temperature range, showing little hysteresis or physical property degradation.

In weight percent, a suitable glass-ceramic composition range is as follows: $SiO_2$ 43–55%, $Al_2O_3$ 31–42%, $Li_2O$ 8–11%, $TiO_2$ 2–6%, and $ZrO_4$ 0–4%.

The beta-eucryptite substrate of the invention is preferably a material with a coefficient of thermal expansion between $-30 \times 10^{-7}/°C.$ and $-90 \times 10^{-7}/°C.$, more preferably $-50 \times 10^{-7}/°C.$ to $-75 \times 10^{-7}/°C.$, even more preferably $-55 \times 10^{-7 \circ}$ C.

In order to produce material with this degree of negative expansion the beta-eucryptite has to be very highly ordered to form alternating $AlO_4$ and $SiO_4$ tetrahedra. This is achieved by heating the crystallized phase at a top temperature near 1300° C. for at least 3 hours, preferably about 4 hours. In order to prevent cracking of the glass a thermal schedule is used which requires heating the glass through a range of temperatures which maintains a desired viscosity during crystallization near $5 \times 10^{10}$ poises thereby precluding sagging or cracking.

The beta-eucryptite materials of the prior art were not obtained in a slab form but rather were prepared as thin coatings or crushed powders. In order to produce a glass-ceramic substrate of the desired size (potentially several centimeters long) a glass of some stability is required. The molten glass must be cast into thin slabs, for example <0.5 in. thick, onto a metal table or mold to ensure rapid cooling. The glass is then annealed at about 700°–800° C. for several hours and then cooled slowly to avoid undesirable stresses.

EXAMPLES OF BETA-EUCRYPTITE COMPOSITIONS

Example 1

A composition containing on a weight percent basis 50.3% $SiO_2$, 36.7% $Al_2O_3$, 9.7% $Li_2O$ and 3.3% $TiO_2$ is melted at 1600° C. in a crucible then the glass is cast onto a cold steel plate to form a disc of about 0.25 to 0.5 in thick. The slab is then cut into bars and heated to 715° C at 300° C./hr, to 765° C. at 140° C./hr, to 1300° C. at 300° C./hr, this temperature for 4 hours then cooled at the furnace cooling rate for several hours to less than about 100° C.

Figure 6:
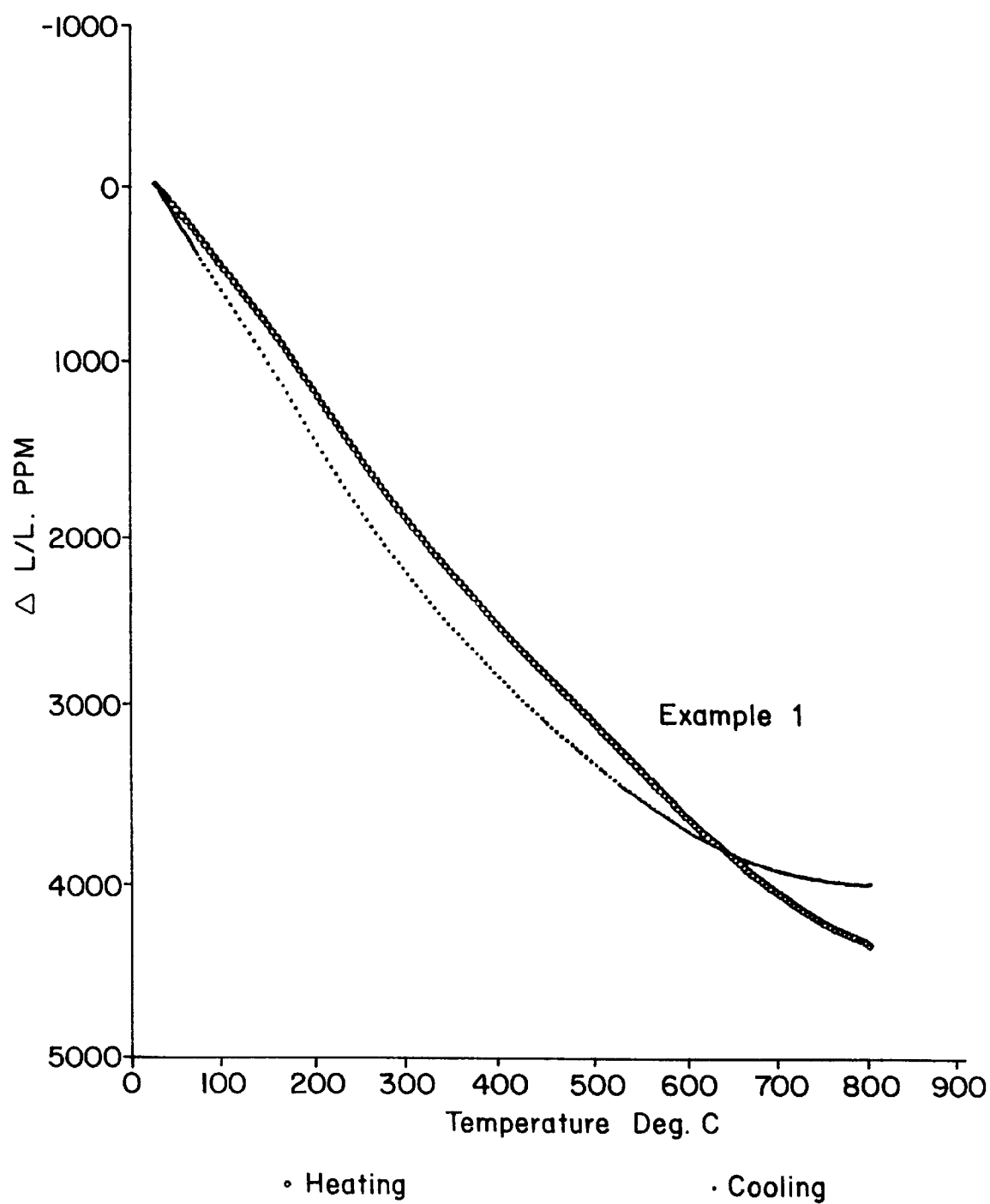
FIG. 6 is a thermal expansion graph of a beta-eucryptite glass-ceramic.

FIG. 6 shows a thermal expansion measurement on a 2 inch (50 mm) sample of the material composition of Example 1 which gives an average negative coefficient of expansion of $-78 \times 10^{-7}/°$ C. (measured between 25°–150° C.) and a moderate level of hysteresis as evidenced by the very similar heating and cooling curves.

Example 2

A composition containing on a weight percent basis 49.0% $SiO_2$, 37.1% $Al_2O_3$, 9.6% $Li_2O$ and 4.3% $TiO_2$ is melted at 1600° C. in a crucible then the glass is cast onto a cold steel plate to form a disc of about 0.25 to 0.5 in (6.3 mm to 12.7 mm) thick. The slab is then cut into bars and heated to 715° C. at 300° C./hr, to 765° C. at 140° C./hr, to 1300° C. at 300° C./hr and held at this temperature for 4 hours, then cooled at the furnace cooling rate for several hours to less than about 100° C. The cooled bar is subjected to four cycles of reheating to 800° C. and cooling to ambient temperatures to minimize hysteresis.

Example 3

A composition identical to that of Example 2 was treated to the same conditions except that it is held at 1300° C. for only 0.5 hours before cooling, and it was not subjected to further heating cycles.

Figure 7:
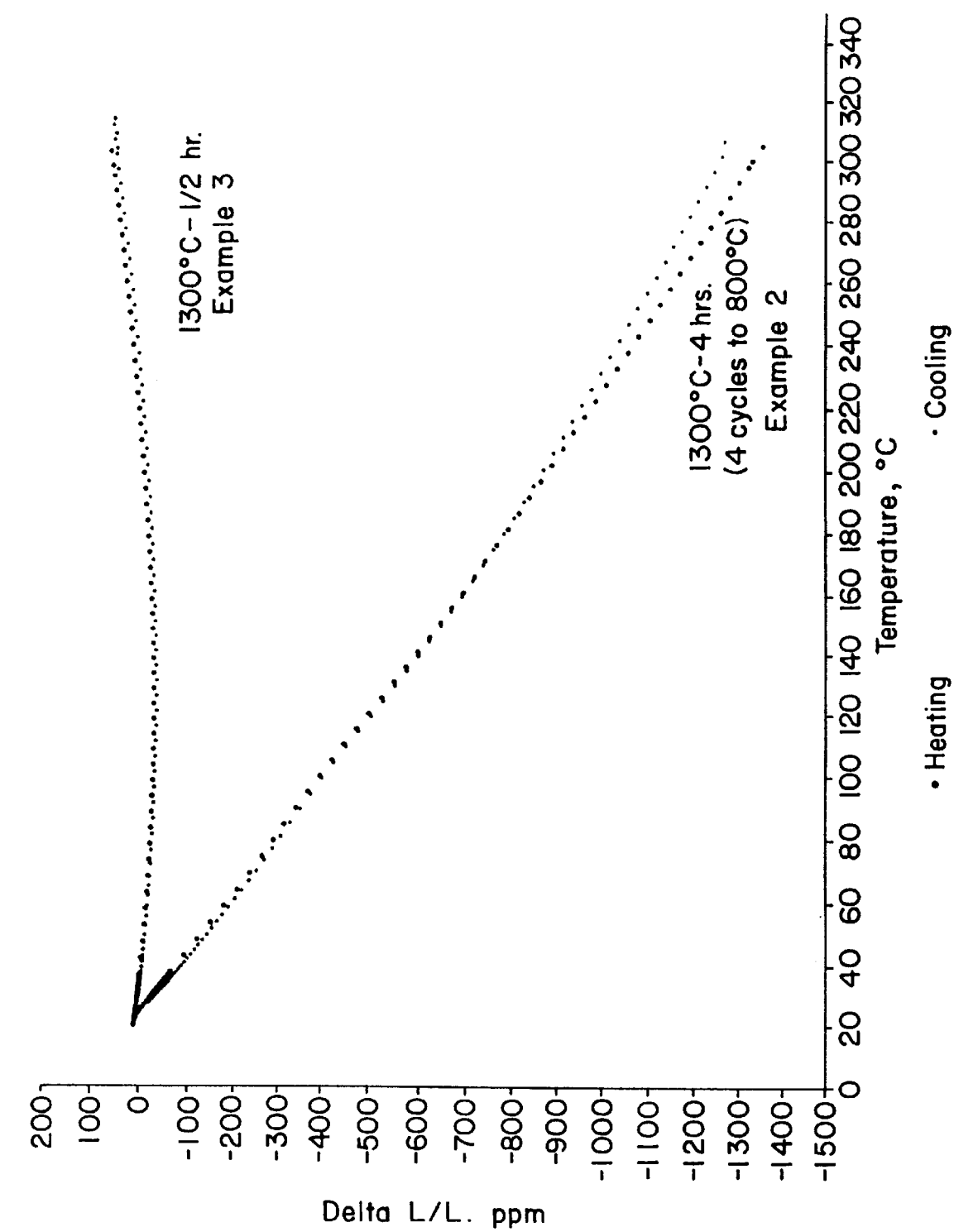
FIG. 7 is a thermal expansion graph of a beta-eucryptite glass-ceramic.

FIG. 7 shows a thermal expansion measurement on the material composition of Examples 2 and 3. Example 2 shows an average negative coefficient of expansion of $-52.8 \times 10^{-7}/°C.$ (measured between 25–150° C.) and essentially no hysteresis as evidenced by the very similar heating and cooling curves. Example 3 shows zero expansion over the same temperature range without hysteresis.

In order to obtain the desired degree of negative expansion it is preferable that the composition be maintained at the top temperature of 1300° C. for about 3 to 4 hours to obtain a highly ordered crystal phase. It is evident that the material of Example 3 which was only maintained at 1300° C. for 0.5 hour has a zero coefficient of expansion and is still relatively disordered.

The heat recycling steps are not essential for achieving satisfactory hysteresis. However, 1 to 4 heat recycling steps may be beneficial. The heating rate is about 300° C. per hour and the bar is maintained at 800° C. for about 1 hour each cycle.

Referring to FIG. 1 there is illustrated a first embodiment of the invention. The optical fiber reflective grating device 20 has a substrate 22 formed from a flat block of a negative expansion material, such as beta-eucryptite. An optical fiber 24 having at least one UV-induced reflective grating 26 written therein is mounted on the surface 28 and attached at either end of the surface at points 30 and 32. It is important that the fiber is always straight and not subject to compression as a result of the negative expansion and thus the fiber is usually mounted under tension. Before attachment the fiber is placed under a controlled tension, as shown schematically by the use of a weight 34. The proper choice of tension assures that the fiber is not under compression at all anticipated use temperatures. However, the fiber can be under tension at all anticipated use temperatures. The required degree of tension to compensate for the negative expansion in a particular application can readily be calculated by those with skill in this art.

The attachment material could be an organic polymer, for example an epoxy cement, an inorganic frit, for example ground glass, ceramic or glass-ceramic material, or a metal. In one embodiment the fiber is tacked to the substrate with a UV-cured epoxy adhesive. Mechanical means for attaching the fiber can also be used.

Generally the optical fiber reflective grating is supplied with a coating material surrounding the fiber. In the preferred packaging approach the coating in the grating region of the fiber is left intact while it is removed in the substrate attachment region at each end of the grating. However, the device can have the coating completely removed between the attachment locations. Removal of the coating can be accomplished by one of two methods: a non-contact, non-chemical stripping mechanism or by conventional chemical stripping.

Figure 2:
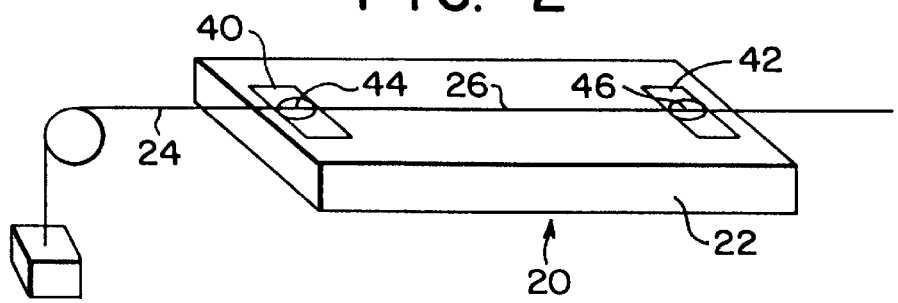
FIG. 2 is a schematic drawing of a second embodiment of an athermal optical fiber grating device.

In another embodiment, FIG. 2, the fiber is not attached directly to the substrate. Bonding pads 40, 42 made from a material differing from the substrate, for example a glass or a ceramic, are attached to the substrate at either end. The fiber 26 is mounted to the pads at points 44, 46. These pads afford better attachment properties of the pad to the fiber than could be achieved from the substrate directly to the fiber because of the large thermal expansion mismatch. Suitable pad materials have a coefficient of thermal expansion intermediate between that of the fiber and the substrate for example between $-50$ and $+5 \times 10^{-7}$, preferably about $-20 \times 10^{-7}$. Alternatively the pad could be a fused silica with a coefficient of expansion closely matching that of the fiber. The pad allows the stress of this joint induced by both the thermal mismatch and the tension of the fiber, to be spread out over a wider area, lessening the chances of cracking and detachment. The attachment materials for the fiber and pad connections are similar to those used for mounting the fiber directly to the substrate, for example, an epoxy cement, an inorganic frit, for example ground glass, ceramic or glass-ceramic material, or a metal.

Figure 3:
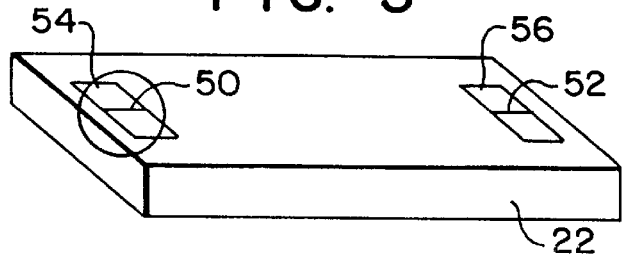
FIG. 3 is a schematic drawing of a third embodiment of an athermal optical fiber grating device.
Figure 4:
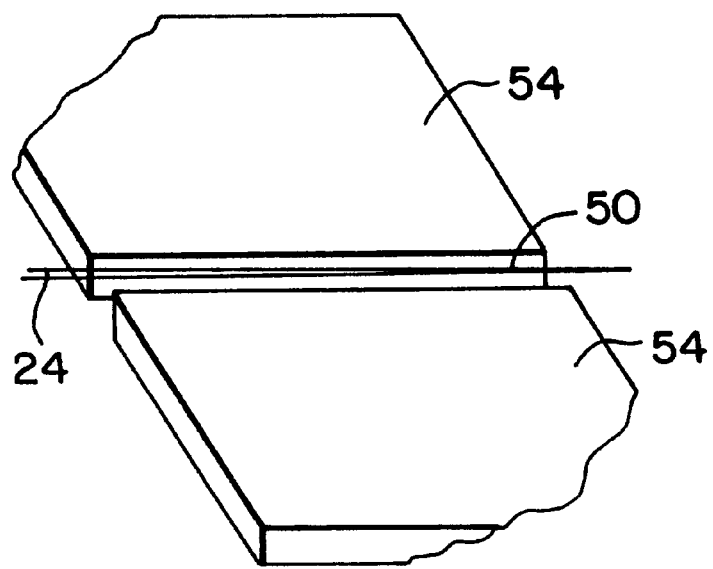
FIG. 4 is an enlarged view of the affixing channel depicted in FIG. 3.

In another embodiment, FIG. 3, the negative expansion of the substrate material 22 is used to create a clamping force on the fiber. The attachment feature, which might be a hole or channel 50, 52 in a raised portion 54, 56 of the substrate, is formed in the substrate at room temperature with a gap that is very slightly smaller than the fiber. Referring to FIG. 4, by lowering the temperature to a point lower than any anticipated use temperature, the substrate expands and allows the insertion of the fiber 24 into the channel 50. Warming of the substrate then causes substrate contraction and creates a clamping force for holding the fiber in the channel.

Figure 5:
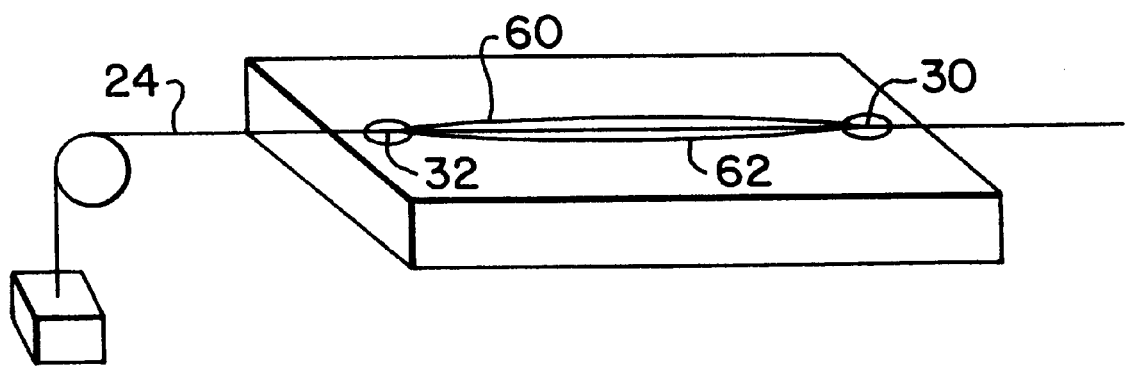
FIG. 5 is a schematic drawing of a fourth embodiment of an athermal optical fiber grating device.

In another embodiment, FIG. 5, the fiber 24 is attached to the substrate at points 30, 32 and the intermediate fiber length 60 is cushioned by a low modulus damping material 62. This low-modulus material, for example a silicone rubber coating surrounding the fiber or a pad of a silicone rubber, a natural or synthetic rubber or mixtures thereof, between the fiber and the substrate protects the fiber reflective grating against external perturbations such as mechanical shock or vibration. Bowing of the fiber is also minimized. In one embodiment the low modulus material is adhesively attached to the fiber and the substrate.

Mounting the fiber under tension will alter the optical properties of the device (for example, the center wavelength of a grating). This can be addressed by biasing the device with a reflective grating written therein to account for the tension, or it can be done by mounting a fiber, for example a germania doped silica fiber, without a reflective grating written therein under tension and then exposing the fiber to UV light in order to fabricate the grating in the device in situ.

In a typical embodiment of the invention the temperature sensitivity of the center wavelength is about 0.0125 nm/° C., the stress sensitivity of the center wavelength is 0.125 nm shift for 9 g of tension, the bare fiber has a diameter of 125 microns, a coated fiber has a diameter of 250 microns. The strength of the fiber is >200 kpsi and therefore has a very high reliability.

Example of an Athermalized Grating on a Beta-Eucryptite Substrate

Figure 8:
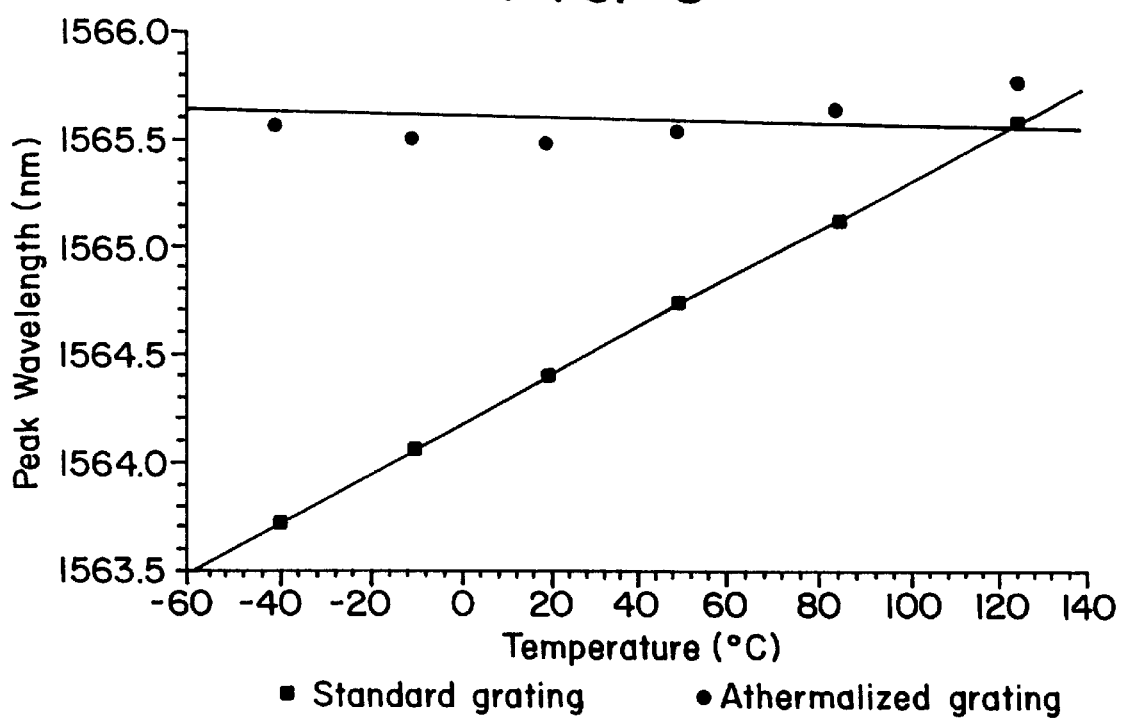
FIG. 8 is a graph of an athermalized grating center wavelength .

The grating was written in a photorefractive-sensitive fiber, Corning SMF-228 fiber, and the fiber was hydrogen loaded at 100 atmospheres in a hydrogen chamber for one week. After removal of the fiber from the hydrogen chamber, a length of approximately 30 mm of coating was removed by mechanical stripping and the fiber was exposed to 240 nm laser irradiation to create the grating. The fiber was then mounted to a substrate of beta-eucryptite, prepared essentially according to the method of Example 2, under a 10 kpsi tension using a UV-curable epoxy adhesive. The assembled grating was heated to 125° C. for 2 hours to out diffuse any remaining hydrogen and to eliminate low stability UV-induced traps. The fiber was thermally cycled between $-40°$ C. and $+125°$ C. A reference fiber was treated in exactly the same way, except it was not attached to a substrate. The grating center wavelength (FIG. 8) varies by approximately 1.9 nm from $-40°$ C. to $+125°$ C. when not attached to the substrate and by only 0.2 nm when attached to the substrate.

Although this invention has been described for UV photo induced gratings it can also be applied to the packaging of other thermally sensitive devices. For instance, optical fiber couplers and optical waveguides could be athermalized by attachment to a negative expansion substrate.

Figure 9:
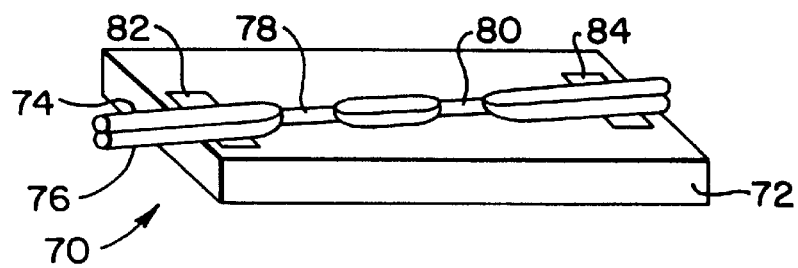
FIG. 9 is a schematic drawing of an embodiment of an athermal optical fiber fused coupler device.

An optical fiber fused coupler has two or more fibers fused together at one or more points along their length and is mounted on a substrate. Such couplers are thermally sensitive which results in a certain amount of thermal instability. Especially sensitive are biconically tapered couplers in which interferometric effects are used, for example a Mach-Zehnder interferometer. Such couplers can be athermalized by mounting the coupler to a negative expansion substrate, such as the beta-eucryptite described in Example 2 above. Referring to FIG. 9 there is illustrated a fused biconical coupler device 70 which includes a negative expansion substrate 72 to which are mounted two fibers 74, 76. The fibers are fused together at regions 78, 80. The fibers are attached to the substrate near the ends at locations 82, 84 in the same manner as described above for the optical fiber reflective grating.

Figure 10:
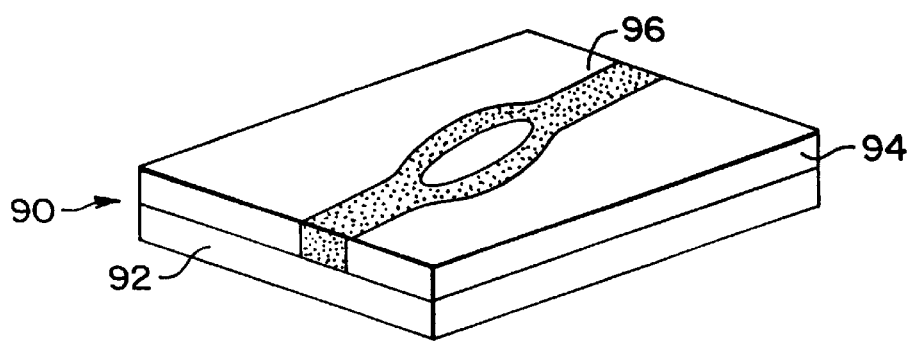
FIG. 10 is a schematic drawing of an embodiment of an athermal planar waveguide device.

Waveguides can be defined, for example, in optical fibers or planar substrates. Such waveguides are thermally sensitive which results in a certain amount of thermal instability. Such waveguides can be athermalized by mounting the waveguide to a negative expansion substrate, such as the beta-eucryptite described in Example 2 above. Referring to FIG. 10, there is illustrated a planar waveguide device 90 which includes a negative expansion substrate 92 on which is adhesively mounted a layer of material 94 in which a planar waveguide 96 is fabricated by methods well known to those skilled in this art. The waveguide material can be, for example, a doped silica such as a germania silicate, other suitable glass compositions, polymers and semiconductors, including semiconductors with gain, such as laser diodes.

The device of this invention is a completely passive system and mechanically simple, and demonstrates athermalization. The method of producing the device is advantageous because it provides temperature compensated optical devices which tolerate shock and vibration and are thermally stable.

The negative thermal expansion substrates of the invention include a glass-ceramic body formed by heat treating a precursor glass body to form insitu crystals and microcracks which contribute to the negative thermal expansion. The formed crystals and microcracks can provide a thermal expansion ranging from about $-20 \times 10^{-7}/°C$. to $-100 \times 10^7/°C$. The formed crystals have an anisotropic thermal expansion, are preferably beta-eucryptite, which preferably have a crystal size greater than 5 $\mu$m. The preferred nucleating crystals of the invention are $Al_2TiO_5$.

The inventive method of making a negative thermal expansion glass-ceramic and inducing the negative expansion includes the steps of heat treating a precursor glass for a sufficient time at sufficient temperature to form anisotropic crystals therein which have crystal grain sizes large enough to cause stress upon their cooling so that a microcrack structure forms in the glass-ceramic.

The preferred composition of the inventive glass-ceramic and the precursor glass are 8.5–11.5 wt. % $Li_2O$, 34–43 wt. % $Al_2O_3$, 42–55 wt. % $SiO_2$, 3.2–5.0 wt. % $TiO_2$, 0–2.0 wt. % $B_2O_3$, and 0–3.0 wt. % $P_2O_5$. A more preferred composition of the inventive glass-ceramic and the precursor glass is: 9.5–10.5 wt. % $Li_2O$, 37–41 wt. % $Al_2O_3$, 45–50 wt. % $SiO_2$, 3.5–4.3 wt. % $TiO_2$, 0–2.0 wt. % $B_2O_3$, and 0–3 wt. % $P_2O_5$.

These compositions of the invention were melted and then formed into glass disk patties. These glass patties were then cut into longitudinal substrate bars and slabs having a thickness of at least 1 mm, which were then heat treated (cerammed) to form the negative thermal expansion glass-ceramics.

Significantly improved glass stability was achieved by increasing the silica content from the molar ratio 1:1:2 to 1:1:2.5 ($Li_2O:Al_2O_3:SiO_2$). Using 4.5% excess titania as nucleating agent and increasing alumina proportionately such that all the titania can precipitate as tielite, an effective composition, 88 KJX (or KGV) is reached which is approximately 90% 1:1:2.5 beta-eucryptite solid solution and 10% tielite by weight. This composition gave excellent glass stability and continuous disk patties about 2 cm in thickness were cast from an induction melter without any internal devitrification. Even stoichiometric 1:1:2 beta-eucryptite with a similar percentage of aluminum titanate could be cast with only surface devitrification from an induction melter in sharp contrast to pure beta-eucryptite with only titania added instead of aluminum titanate, which completely devitrified when poured as a patty (88 KSA vs. KSE). Table 1 presents compositions of the invention, ceram schedules (heat treating schedules), CTEs, and M.O.R. strengths.

TABLE 1

| 88 | JYV | JYW | JYY | JZI | ---→ | KCG | KFQ | KGJ |
|---|---|---|---|---|---|---|---|---|
| | | | | | | Composition | | |
| $SiO_2$ | 46.2 | 45.5 | 43.8 | 50.0 | | 50.8 | 50.6 | 46.8 |
| $Al_2O_3$ | 39.4 | 38.9 | 37.5 | 36.5 | | 35.3 | 35.2 | 37.8 |
| $Li_2O$ | 10.6 | 10.4 | 7.7 | 9.6 | | 8.8 | 10.3 | 9.9 |
| ZnO | — | — | 7.2 | — | | — | — | — |
| $P_2O_5$ | — | — | — | — | | — | — | — |
| $B_2O_3$ | — | — | — | — | | — | — | 0.9 |
| $Na_2O$ | — | — | — | — | | 1.0 | — | 0.2 |
| $TiO_2$ | 3.8 | 5.2 | 3.8 | 3.8 | | 4.1 | 1.9 | 4.3 |
| $ZrO_2$ | — | — | — | — | | — | 1.9 | — |
| ceram schedule | 750-2, 850-4 | 750-2, 850-4 | 750-2, 850-4 | 750-2, 1300-4 | 750-2, 1100-4 | 1100-2, 1300-4 | 675-2, 1300-4 | *AVC schedule to 1300° C.- 4 hrs. |
| $\alpha$(R.T.→ 150° C.) | — | — | — | $-70 \times 10^{-7}/°C.$ | $3 \times 10^{-7}/°C.$ | — | — | — |

| 88 | KGV | ---→ | KOZ | KSA | KSE | KXU | ---→ | KXV |
|---|---|---|---|---|---|---|---|---|
| $SiO_2$ | 48.0 | | 38.3 | 43.1 | 45.6 | 48.5 | | 48.7 |
| $Al_2O_3$ | 38.1 | | 43.2 | 41.9 | 40.5 | 37.9 | | 37.8 |
| $Li_2O$ | 9.6 | | 11.4 | 10.8 | 11.4 | 9.6 | | 9.7 |
| ZnO | — | | — | — | — | — | | — |
| $P_2O_5$ | — | | 2.9 | — | — | — | | — |
| $B_2O_3$ | — | | — | — | — | — | | — |
| $Na_2O$ | — | | — | — | — | — | | — |
| $TiO_2$ | 4.3 | | 4.3 | 4.3 | 4.3 | 3.9 | | 3.8 |
| $ZrO_2$ | — | | — | — | — | — | | — |
| ($Al_2TiO_5$) | (9.8) | | (9.8) | (9.8) | (9.8) | (9.0) | | (8.5) |

TABLE 1-continued

| | Composition | | | | | | | | |
|---|---|---|---|---|---|---|---|---|---|
| ceram schedule | AVC→ 1300° -4 hrs. | → 1200° -hrs. or 1300° - 1/2 hrs. | AVC→ 1300° -4 hrs. | AVC→ 1300° -4 hrs. | — | 765-2, 1300-4 | 765-2, 1200-4 | 765-2, 1300-4 | 765-2, 1200-4 |
| α (R.T.→ 150° C.) | $-51 \times 10^{-7}/$°C. | $-3 \times 10^{-7}/$°C. | $-40 \times 10^{-7}/$°C. | $-75 \times 10^{-7}/$°C. | — | $-70.4 \times 10^{-7}/$°C. | $-2.5 \times 10^{-7}/$°C. | $-73.4 \times 10^{-7}/$°C. | $-2.8 \times 10^{-7}/$°C. |
| M.O.R. abraded | 600 psi | — | — | — | — | 6400 psi | — | 5800 psi | — |

*140° /hr. between 715 and 765

One of the most significant observations in terms of merely adding nucleating agents such as titania or combinations of titania and zirconia to beta-eucryptite-forming compositions along the join eucryptite-silica (from 1:1:2 to 1:1:3) was that regardless of glass stability, which improved from 1:1:2 to 1:1:3, all compositions cracked up severely on crystallization. In order to prevent this phenomenon, excess alumina was added in rough molar proportions to the amount of titania used for nucleation. Operating on this principle, it was observed that glasses containing below about 10.5 $Li_2O$ could be cast and cerammed in patties 1–2 cm in thickness with few or no cracks. Strength bars cut from these patties were crystallized without any macrocracks. Glasses containing more than 10.5 weight percent lithia, on the other hand, generally had to be pressed to avoid devitrification. Nonetheless, bars cut from these patties could readily be crystallized without macrocracks. One of the most consistent compositions at the 1:1:2.5 stoichiometry and excess alumina and titania was 88 KJX. Versions of this composition with less aluminum titanate, i.e. 88 KXU and KXV, were also found interesting, particularly for more negative CTE than that of 88 KJX.

It was found that macrocracking could be minimized or eliminated in peraluminous compositions by using a modified AVC (automatic viscosity control) thermal cycle. This cycle involved a slow-down in the heating rate corresponding to nucleation in the range 720–765° C. typically to about 140° C./hr. from the usual 300° C./hr. This could be modified using a nucleation hold at 765° C./2 hrs.

The top temperature found to give a consistently negative thermal expansion coefficient was 1300° C. A 4-hr. hold at this temperature was necessary. Curiously, terminating the schedule at lower temperatures like 1000° C., 1100° C., 1200° C., or even 1300° C. for only ½ hr. produced a near-zero, not significantly negative, coefficient of thermal expansion. FIG. 7 shows the dramatic difference between holding ½ hr. at 1300° C. versus 4 hrs. at this temperature, a CTE of roughly zero vs. $-50 \times 10^{-7}$/°C. Clearly, the near-zero thermal expansion was closer to the x-ray diffraction calculated average expansion of $(2\alpha_a + \alpha_c)/3$ or $-4 \times 10^{-7}$/°C.

Figure 11A:
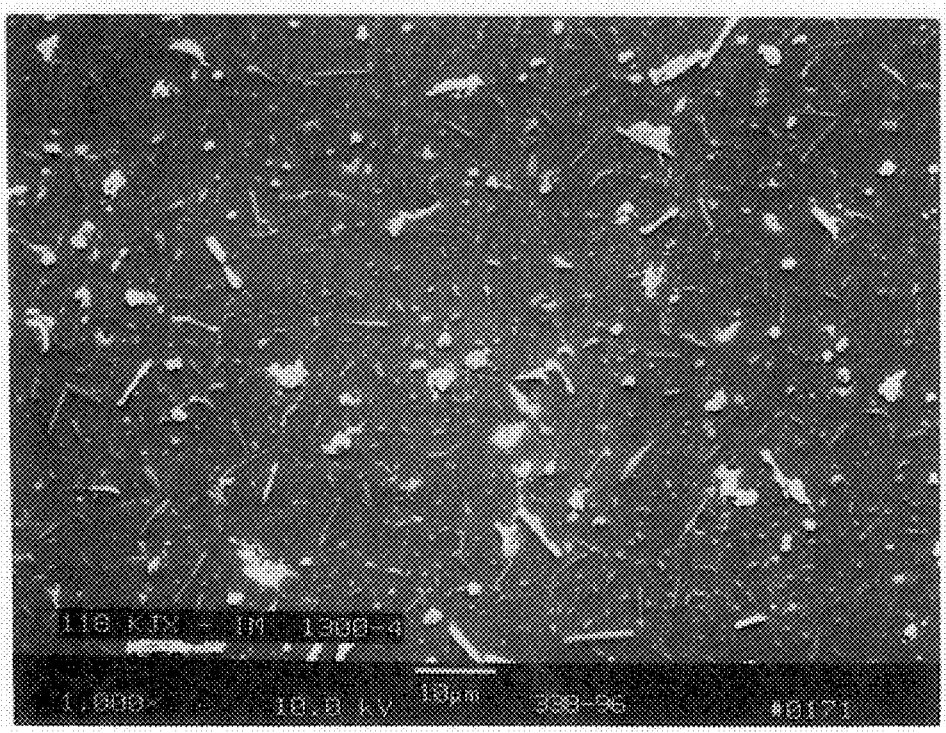
FIG. 11*a* is a photomicrograph taken with a SEM (Scanning Electron Microscope) of composition KJX.
Figure 11B:
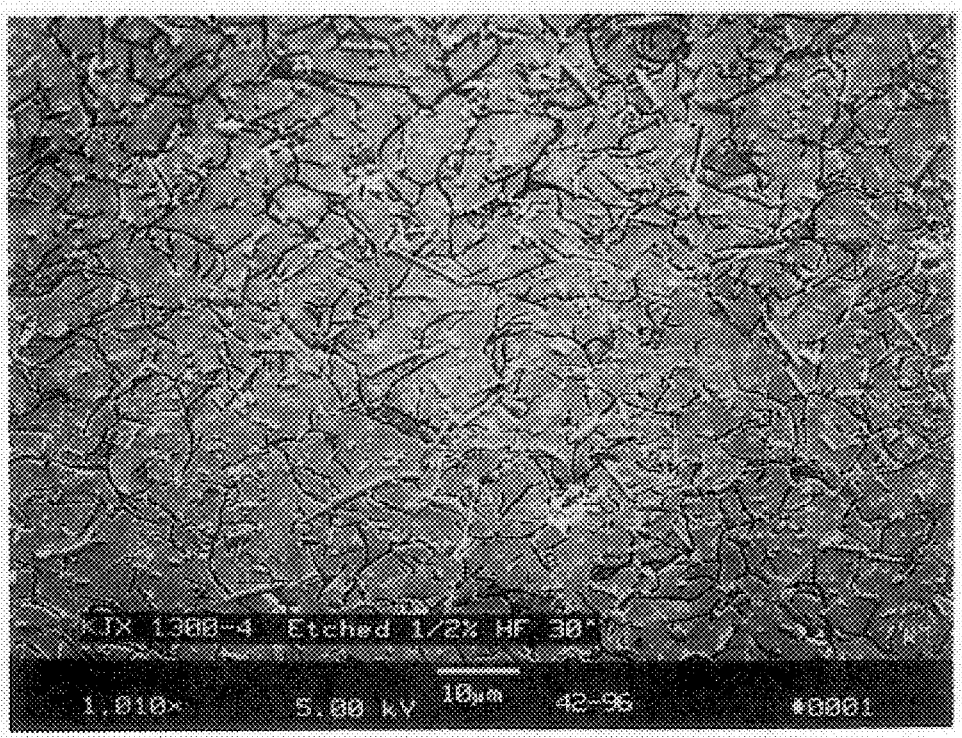
FIG. 11*b* is a photomicrograph taken with a SEM of composition KJX.
Figure 12A:
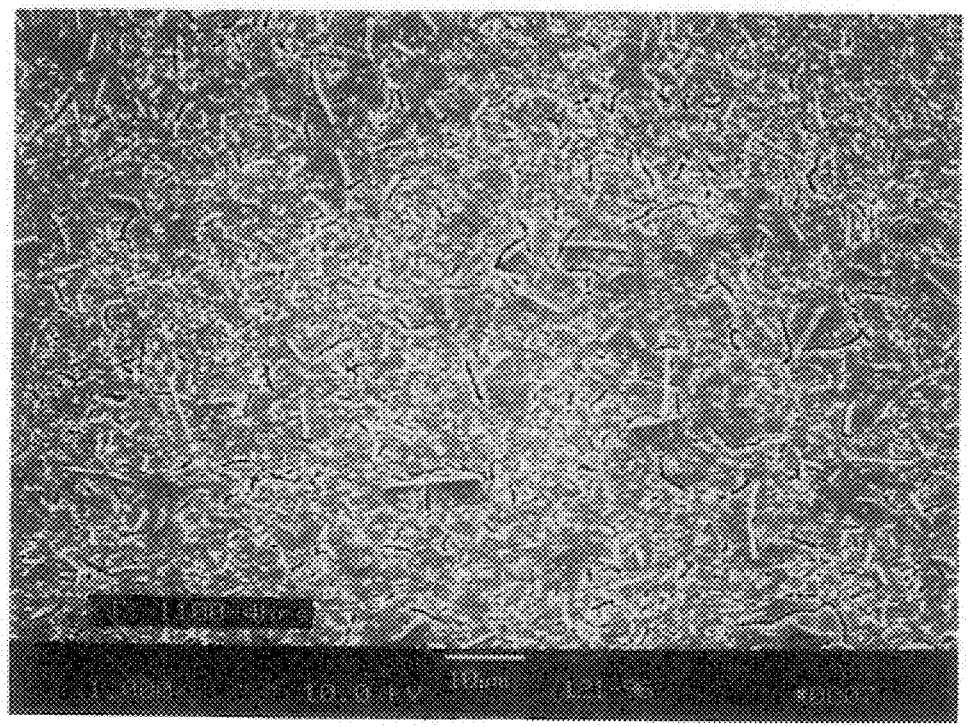
FIG. 12*a* is a photomicrograph taken with a SEM of composition KJX.
Figure 12B:
FIG. 12*b* is a photomicrograph taken with a SEM of composition KJX.

HF acid etching of polished surfaces of the inventive glass-ceramic prior to SEM observation produced microphotographs which revealed an extensive network of microcracking in the samples held for 4 hrs. at 1300° C. (FIGS. 11a and 11b). Very few isolated cracks are found in samples held at 1100° C. for 4 hrs. (FIG. 12a and 12b). It is therefore believed that the phenomenon of microcrack induced bias is the main reason for the strong negative thermal expansion of the invention. As the crystal size increases by secondary grain growth beyond a certain diameter through crystallization holds at high temperatures like 1300° C., less than 100° below the onset of melting, a critical size is reached. This creates negative expansion bias towards crystals oriented with their c-axis in the direction of CTE measurement as follows from the following logic. If the crystal size is large enough, say between five and ten microns, strong stresses and resulting stains develop along crystal boundaries where a and c axes of adjacent grains are nearly parallel. With large enough crystal sizes, the anisotropic strain mismatch ($\alpha_a - \alpha_c$) dDT can cause fracture due to the resulting stored elastic strain energy. The effect of the normal positive CTE along the a-axis is to cause shrinkage on cooling, and this is largely accommodated by opening of the microcracks. The expansion in the c-direction, on the other hand, cannot be so accommodated and therefore becomes the predominant contributor to the negative CTE much closer to the $\alpha_a$ than $\alpha_c$. It was thus realized that the fine microcracking was primarily responsible for the strong negative thermal expansions in this material, and not any ordering or disordering of aluminum and silicon in the stuffed b-quartz or beta-eucryptite structures. To prevent macrocracking and induce fine microcracking a ceram schedule with the nucleation hold at 765° C. and a top crystallization hold of at least 1300° C. for 4 hrs. was found effective for standard compositions like 88 KJX and other related materials. It was also found that going higher in the final crystallization soak, i.e. to 1320° C., produced instead of the normal white material, a cream-colored glass-ceramic which showed some variability in properties, presumably due to the decomposition of $Al_2TiO_2$ to rutile and corundum, and the accompanying volume change.

In the optimized peraluminous compositions, the normal phase assemblage in the beta-eucryptite glass-ceramics cerammed to 1300° C. for 4 hrs. is beta-eucryptite and tielite ($Al_2TiO_5$). This assemblage is prevalent at all top cerammming temperatures from 800° C. to 1300° C. for times of at least 16 hrs. It is believed that the tielite phase is the first to crystallize from an amorphous phase separation enriched in titania and alumina. This phase assemblage begins to break down at 1310° C. or above where the tielite is apparently unstable relative to corundum, $Al_2O_3$, and rutile, $TiO_2$. Occasionally, a very small amount of lithium-titanate or lithium-titanosilicate ($Li_2Ti_3O_7$ or $Li_2SiTi_3O_9$) is also present. The beta-eucryptite is stable to at least 1350° C. where it begins to melt according to the phase diagram of the $Li_2O \cdot Al_2O_3 \cdot 2SiO_2$(eucryptite)-$SiO_2$ system. This phase ultimately melts completely and incongruently to LiAl5O8 (lithia spinel) and liquid.

Glass-ceramic compositions on the join between beta-eucryptite and silica with only additions of titania give the assemblage beta-eucryptite plus rutile.

It is believed that invention's microstructure plays a particularly important role in the negative expansion beta-eucryptite glass-ceramics of the invention. In addition to the usual variables such as phase assemblage, amount and distribution of each phase, and grain size, these beta-eucryptite glass-ceramics reveal microcracks induced by the anisotropic expansion mismatch strains when the grain size reaches the critical size. When the strain mismatch leads to the level of elastic stored energy that exceeds the critical strain energy release rate, spontaneous release of the stored energy manifests in the form of microcracks, the extent of which is proportional to the stored energy.

The network of microcracks consists of three dimensional interconnected microcracks, which lead to the thermal expansion coefficients that are different from the composite expansion inherent to the phase assemblage. However, the negative thermal expansion and the degree of negativity are not easily definable quantitatively but are strongly biased towards the c-axis expansion.

It is believed that the negative expansion behavior due to the microcrack networks depends certainly on the anisotropic expansion coefficient of the particular phases(s) and the grain size in particular. Only when the grain size exceeds a certain critical value, a negative expansion, which is much more negative than the average beta-eucryptite aggregates=⅓ $(2\alpha_a+\alpha_c)$, can be observed.

Hysteresis is the difference in expansion behaviors between heating and cooling the negative expansion glass-ceramic substrate. The sources of such hysteresis could include residual stress, phase instability, phase transformation, and structural order/disorder transition.

Table 2 provides the CTEs for various compositions of the invention at various heat treatment schedules.

TABLE 2

CTE Data vs. Ceram Treatments
($10^{-7}/°$ C. over 20°–100° C., Heating/Cooling)

| Ceram Treatments | 88 KJX | 88 KSA | 88 KXU | 88 KXV |
|---|---|---|---|---|
| 1000° C.-4 hrs | −2.6/−2.8 | — | — | — |
| 1150° C.-4 hrs | −2.8/−2.9 | +0.7/+3.1 | — | — |
| 1200° C.-4 hrs | — | +0.6/+2.1 | −4.4/−4.4 | −4.7/−4.2 |
| 1290° C.-4 hrs, 2 × 800° C. | −31.1/−32.1 | — | — | −49.5/−51.9 |
| 1300° C.-½ hr, | −4.0/−3.8 | — | — | |
| 1300° C.-4 hrs, 2 × 800° C. | −43.6/−43.8 | −31.6/−53.5 | −62.0/−61.4 | −64.5/−65.1 |
| 1310° C.-4 hrs, 2 × 800° C. | −61.8/−62.0 | — | −61.8/−66.7 | −63.3/−69.2 |
| 1325° C.-4 hrs | — | — | −82.4/−85.5 | −86.9/−91.0 |
| 1300° C.-4 hrs, 2 × 400° C. | — | — | — | −52.2/−52.0 |
| 1300° C.-4 hrs, 2 × 600° C. | — | — | — | −51.7/−52.2 |
| 1300° C.-4 hrs, 2 × 800° C. | −43.6/−43.8 | — | — | −49.6/−49.9 |
| 1300° C.-16 hrs, 2 × 600° C. | −63.9/−64.2 | — | — | −68.1/−68.4 |
| 1300° C.-16 hrs, 2 × 800° C. | — | — | — | −64.3 (Heating) |

FIGS. 12a and 12b shows SEM micrographs of 88 KJX (etched 1 min. in 0.1 % HF) after 1100° C. for 4 hr. heat treatment. Upon cooling, the specimen underwent microcracking, but not extensive enough to build an interconnected microcrack network. FIG. 12a also shows elongated tielite ($Al_2TiO_5$) crystals, which are also highly anisotropic, along with the isolated microcracks similar in size as tielite crystals. After 1100° C.-4 hr. treatment, CTE is about −3.0×$10^{-7}$/°C. (20–100° C.). Table 3 shows the axial and the aggregate expansion coefficient of beta-eucryptite and $Al_2TiO_5$. The average linear thermal expansion coefficient reflects the inherent expansion behavior of polycrystalline aggregates without the microcracks taken into account. Highly anisotropic beta-eucryptite as well as $Al_2TiO_5$ aggregates undergo extensive microcracking above certain critical grain size that greatly alters CTEs, the magnitude of which depends on the degree of microcracking in addition to the anisotropic thermal expansion coefficients of the crystals.

TABLE 3

| Crystal Structure CTE ($\times 10^{-7}$/° C.) | beta-Eucryptite Hexagonal (6422) (25° C.–800° C.) | $Al_2TiO_2$ Orthorhombic (25° C.–1000° C.) |
|---|---|---|
| $\alpha_c$ | −176 | −26 |
| $\alpha_a$ | +82 | +118 |
| $\alpha_b$ | +82 | +194 |
| Volume Expansion | −12 | +286 |
| Av. Linear Expansion | −4 | +95 |
| Density (g/cc) | 2.40 | 3.68 |

Figure 13A:
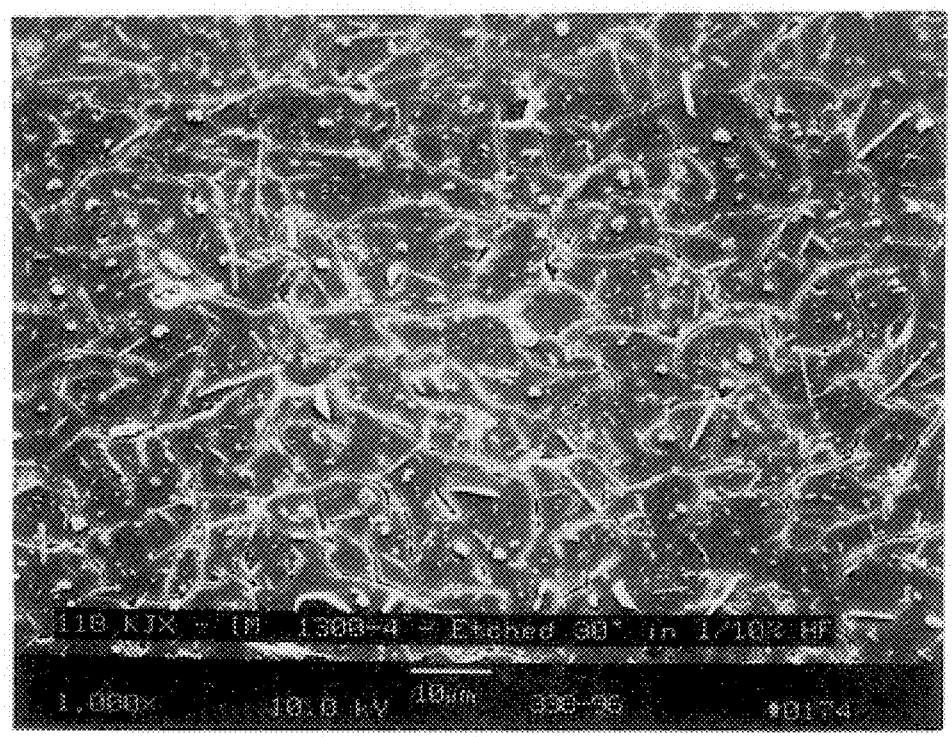
FIG. 13*a* is a photomicrograph taken with a SEM of composition KJX.
Figure 13B:
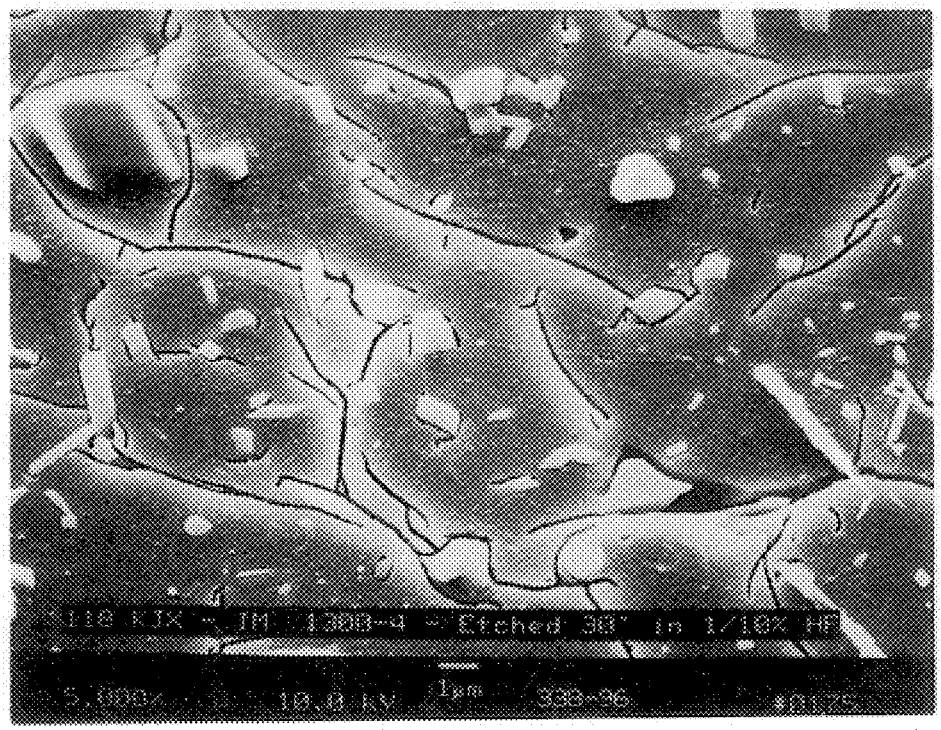
FIG. 13*b* is a photomicrograph taken with a SEM of composition KJX.

FIGS. 13a and 13b show SEM micrographs of etched 118 KJX following 1300° C.-4 hr. treatment. A clearly interconnected microcrack network has formed in the scale similar to that of grain size of about 7–10 μm. Also, elongated $Al_2TiO_5$ crystals are uniformly distributed with the interparticle spacing of about 5–10 μm. The expansion coefficients after 1300° C./4 hr. are about −50×$10/^7$° C. (20–100° C.). The CTE values appear to be highly sensitive to the top ceram temperatures, varying from about −31, 44, and −62 ($\times 10^7$/°C.) after 4 hr. treatments at 1290° C., 1310° C., and 1310° C., respectively.

Figure 14A:
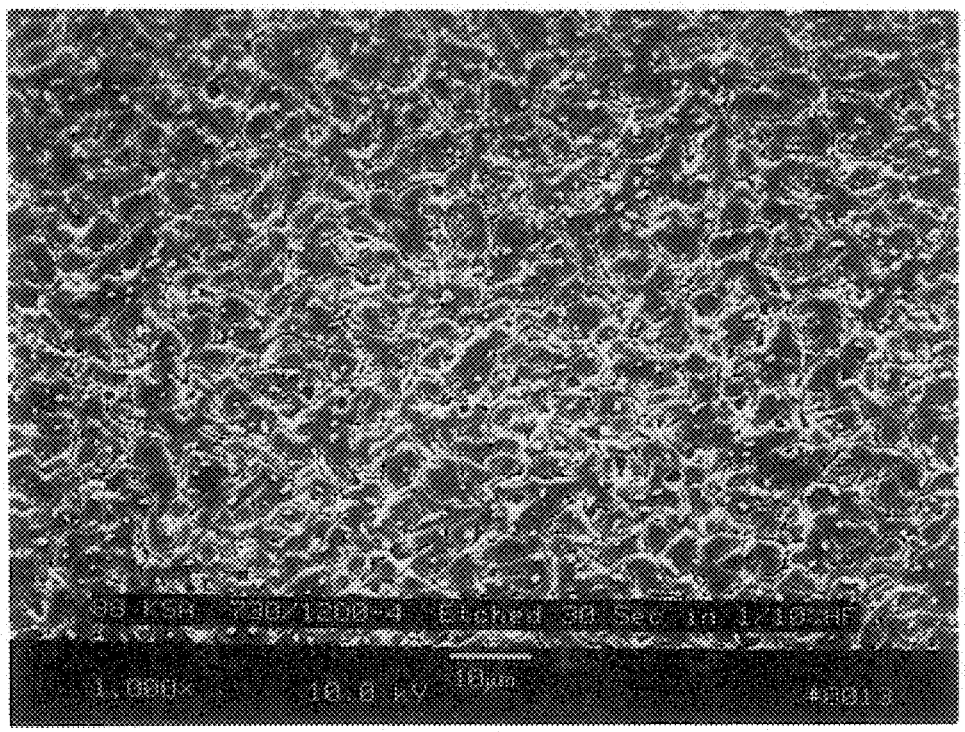
FIG. 14*a* is a photomicrograph taken with a SEM of composition KSA.
Figure 14B:
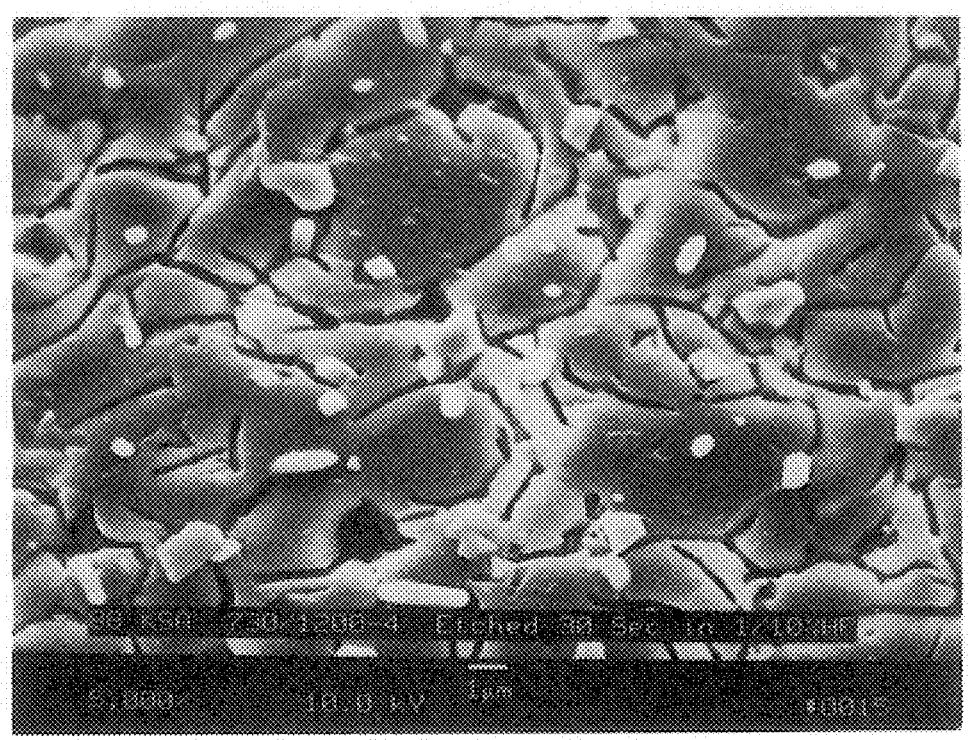
FIG. 14*b* is a photomicrograph taken with a SEM of composition KSA.

The SEMs shown in FIGS. 14a and 14b are from 88 KSA (stoichiometric beta-eucryptite with 10 wt. % $Al_2TiO_5$) and have on extremely fine microcracking network of 3–5 μm in size, along with fine Al2TiO5 crystals even after 1200° C.-4 hr., ceram treatment. In the case of 88 KSA, even after 1200° C.-4 hr., the anisotropic expansion induced stress was sufficiently high to cause microcracking. Evidently, the grain size in 88 KSA is so fine that the grain size of 3–5 μm range is in the borderline size at which microcracking is consistent. Extremely fine $Al_2TiO_5$ particle dispersion appears to play an effective grain growth inhibiting role that exacerbate the onset of microcracking. The advantage of such a fine scale microcracking is that it provides a negative expansion combined with relatively high strength.

Microcracking in the stoichiometric beta-eucryptite glass-ceramics (88 KSA) has led to the realization that the grain size must be increased to a size larger than the critical size, and subsequently the amount of $Al_2TiO_5$ nucleant was reduced in steps in order to provide a coarser microstructure. 88 KXU and 88 KXV contain 9.0 and 8.5 w/o of Al2TiO5, respectively, compared to 9.8% for 88 KJX and KSA.

Figure 15A:
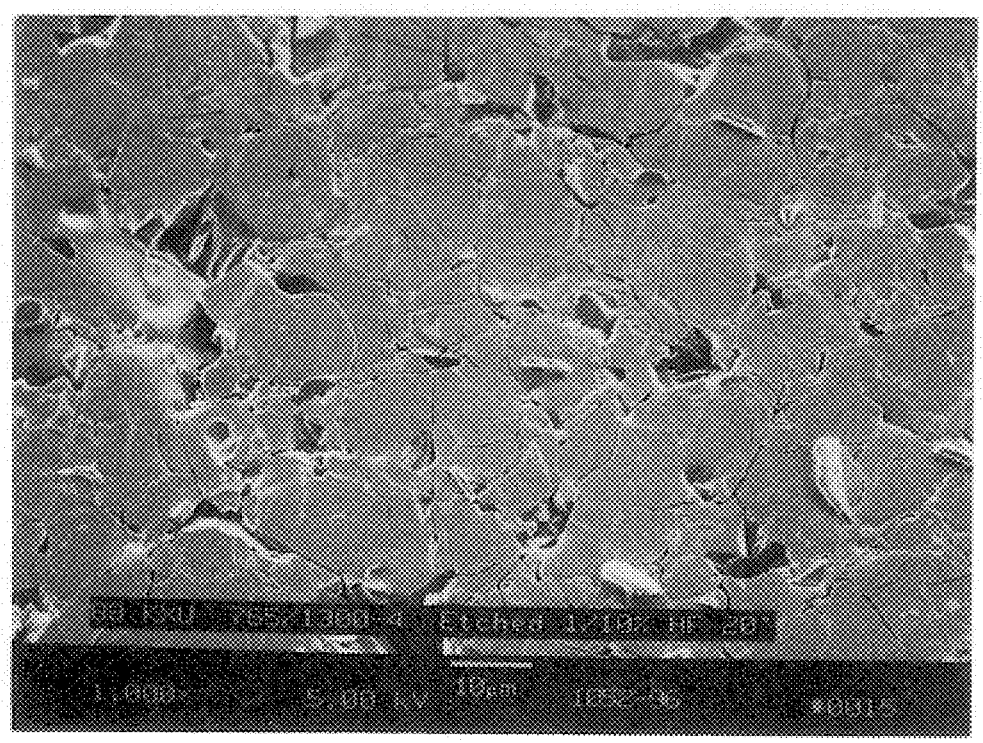
FIG. 15*a* is a photomicrograph taken with a SEM of composition KSU.
Figure 15B:
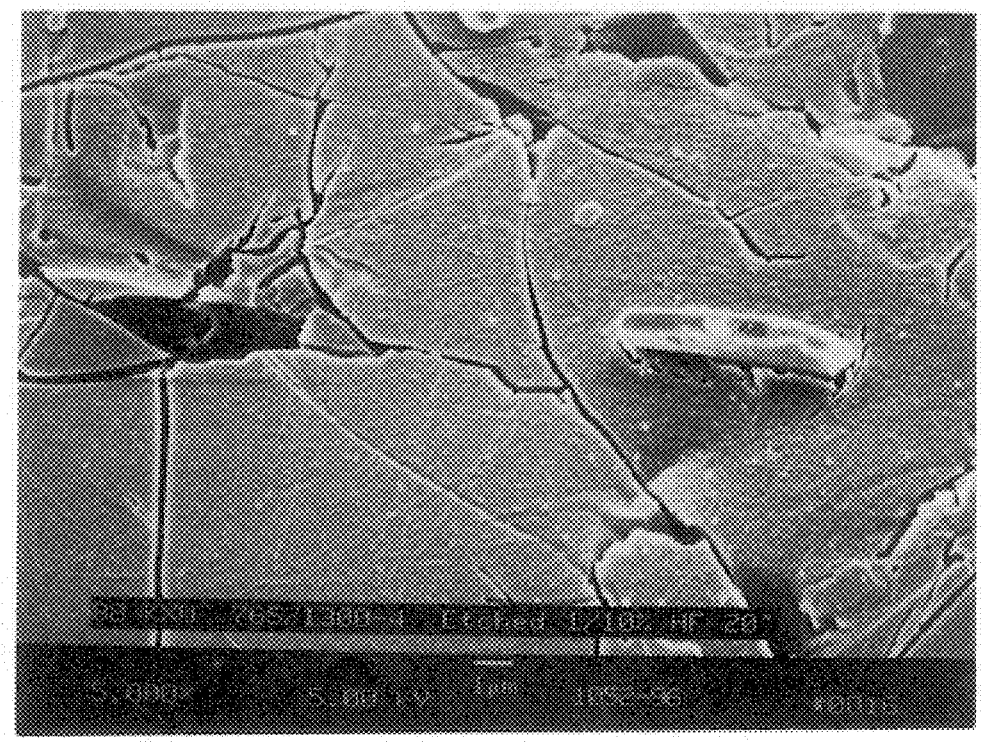
FIG. 15*b* is a photomicrograph taken with a SEM of composition KSU.
Figure 16A:
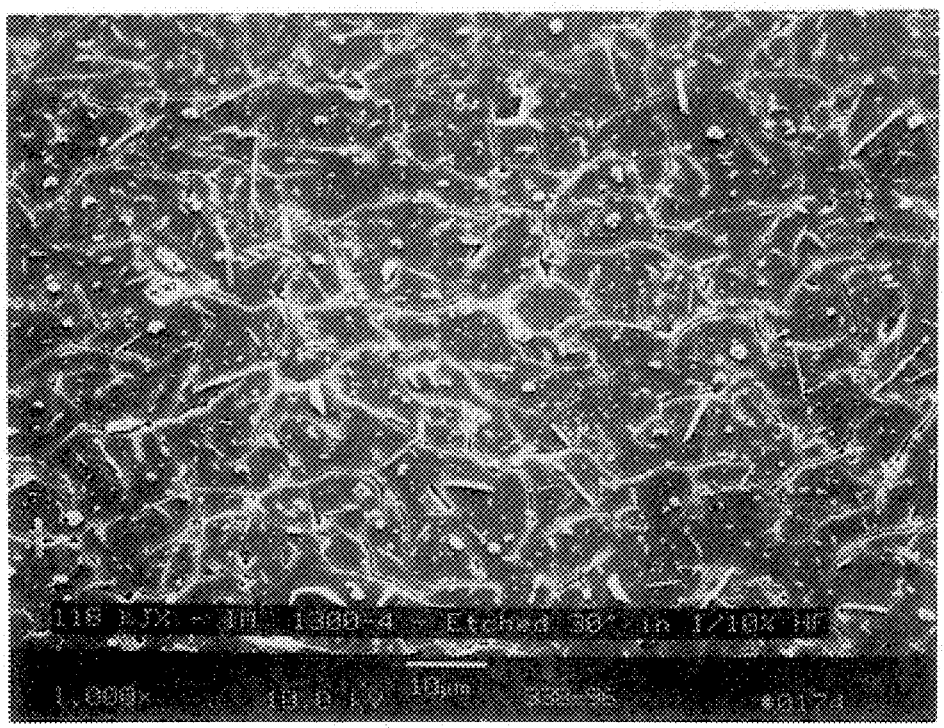
FIG. 16*a* is a photomicrograph taken with a SEM of composition KJX.
Figure 16B:
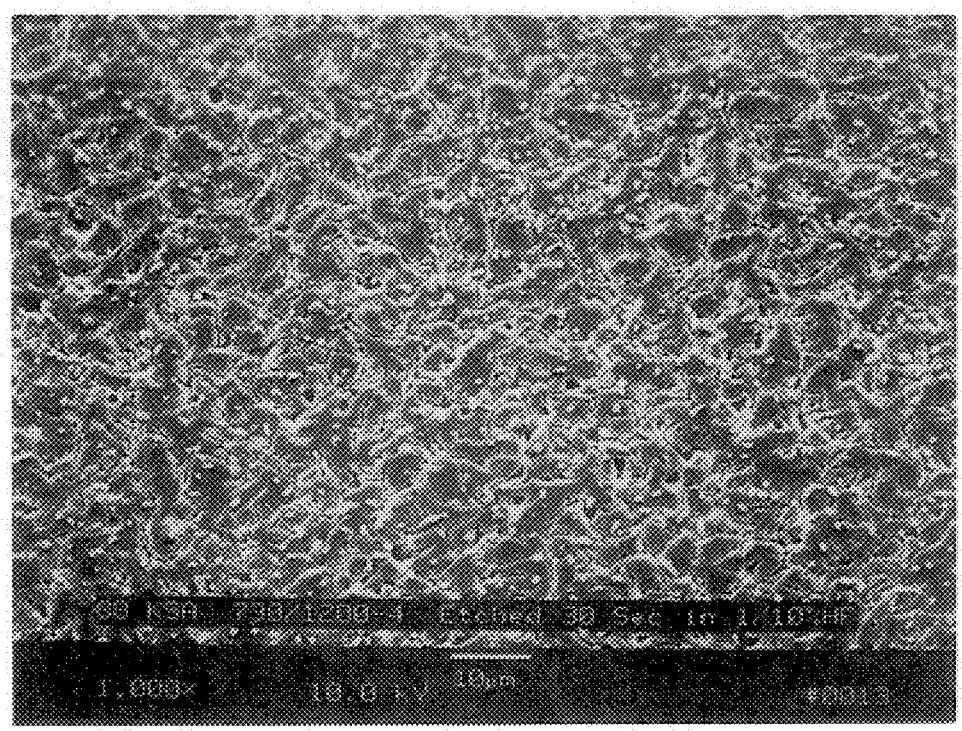
FIG. 16*b* is a photomicrograph taken with a SEM of composition KSA.
Figure 16C:
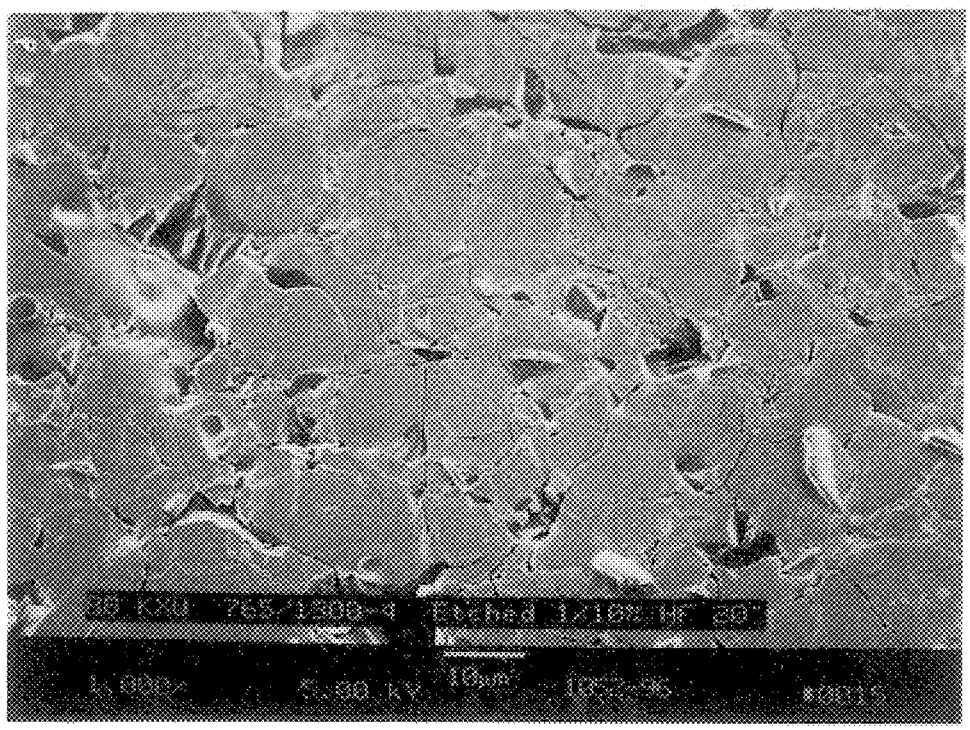
FIG. 16*c* is a photomicrograph taken with a SEM of composition KXU.
Figure 16D:
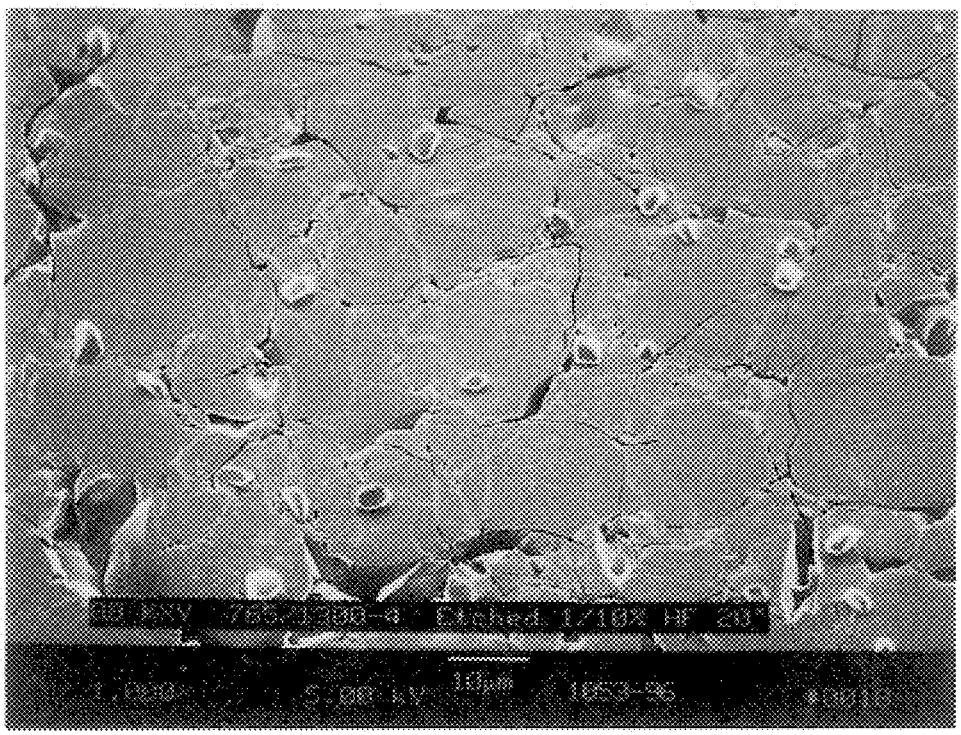
FIG. 16*d* is a photomicrograph taken with a SEM of composition KXV.
Figure 17A:
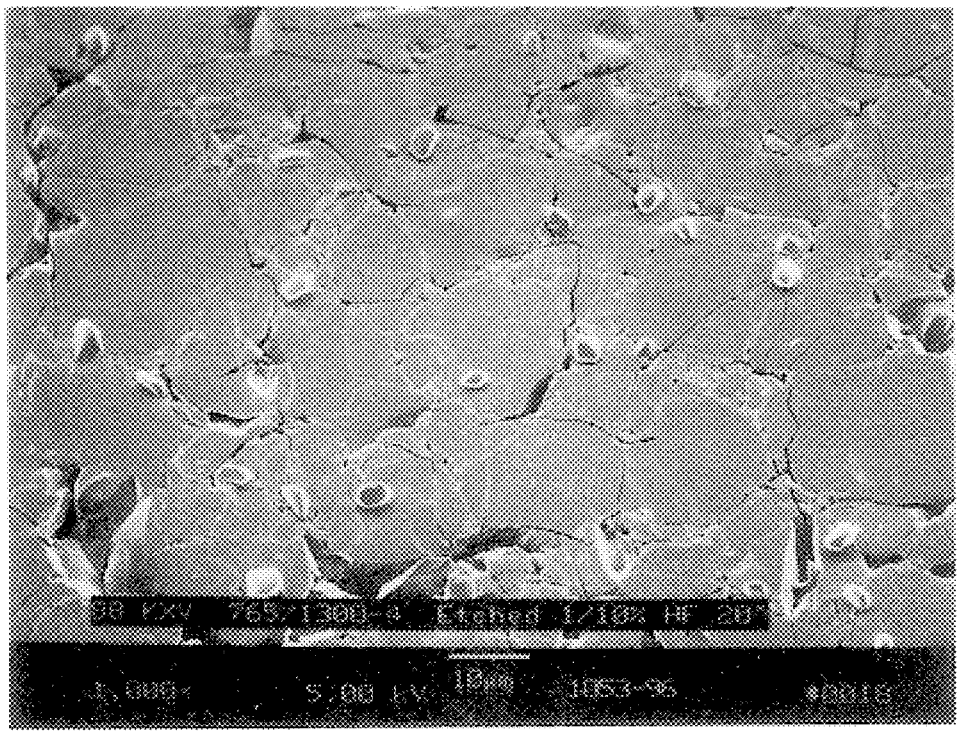
FIG. 17*a* is a photomicrograph taken with a SEM of composition KXV.
Figure 17B:
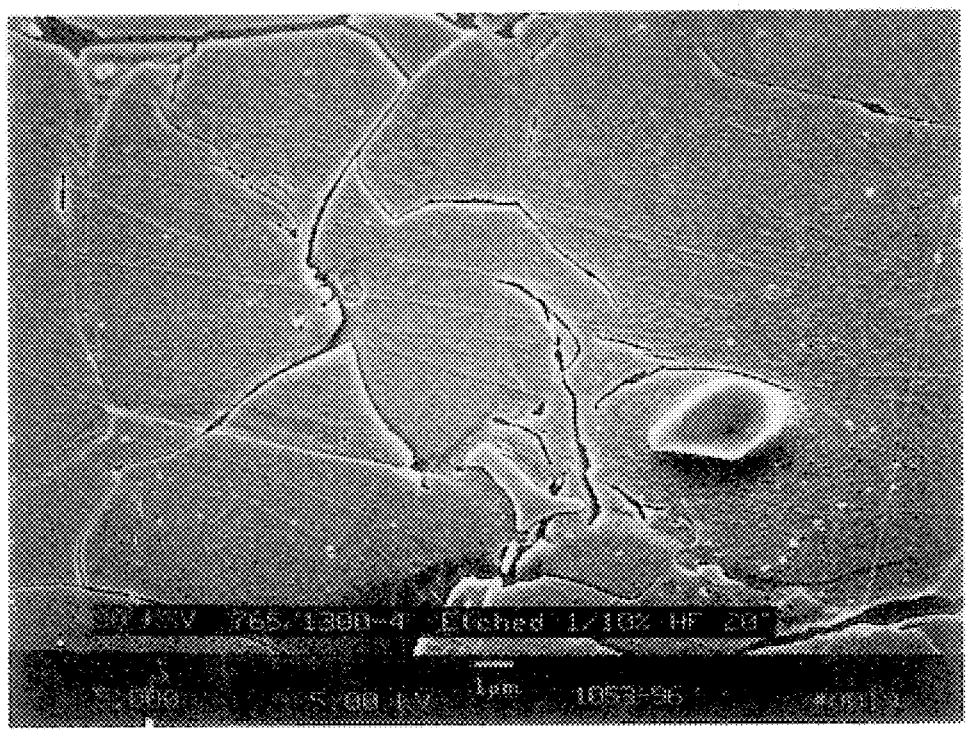
FIG. 17*b* is a photomicrograph taken with a SEM of composition KXV.
Figure 18:
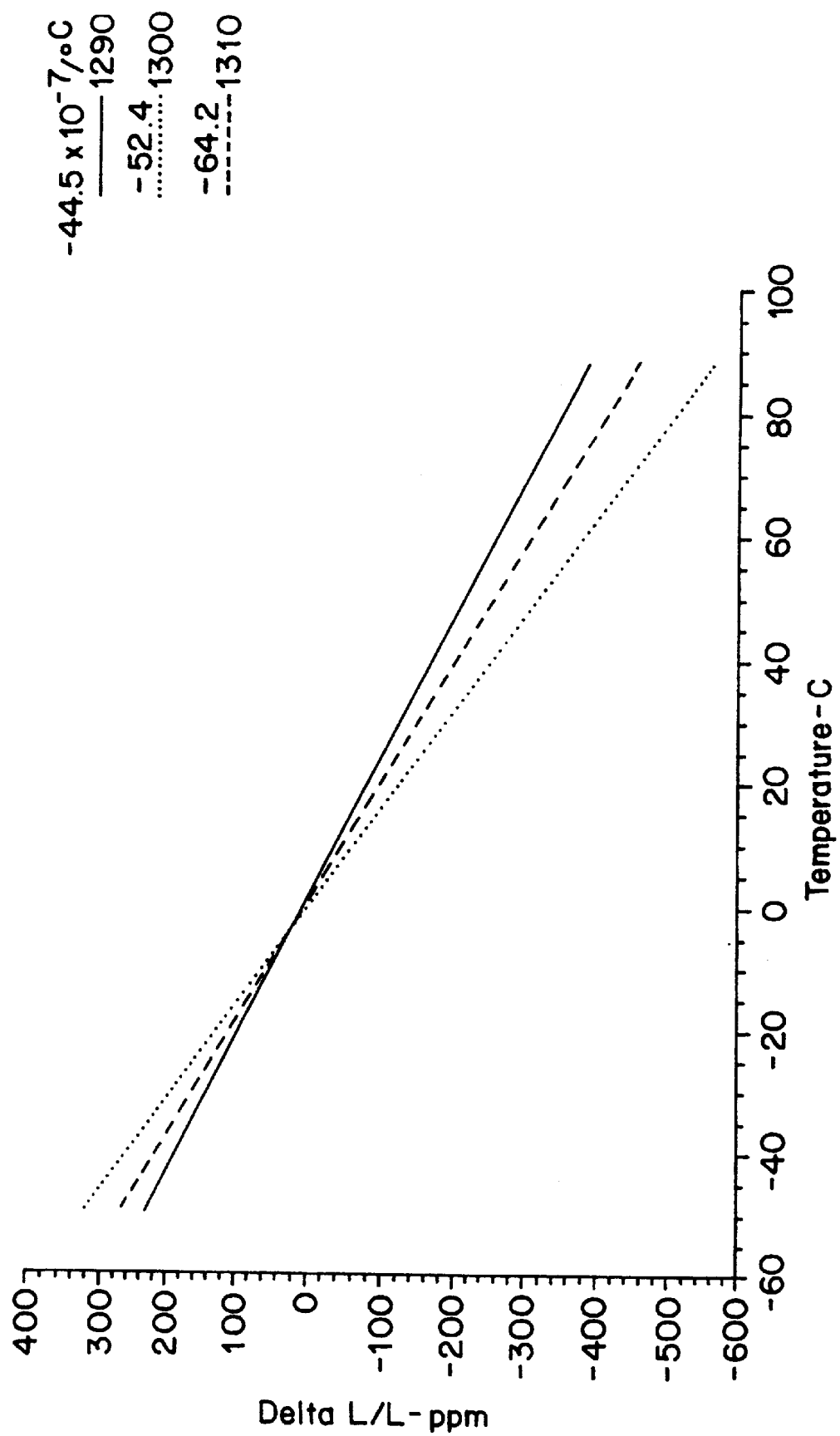
FIG. 18 is a thermal expansion graph of composition KXV.
Figure 19:
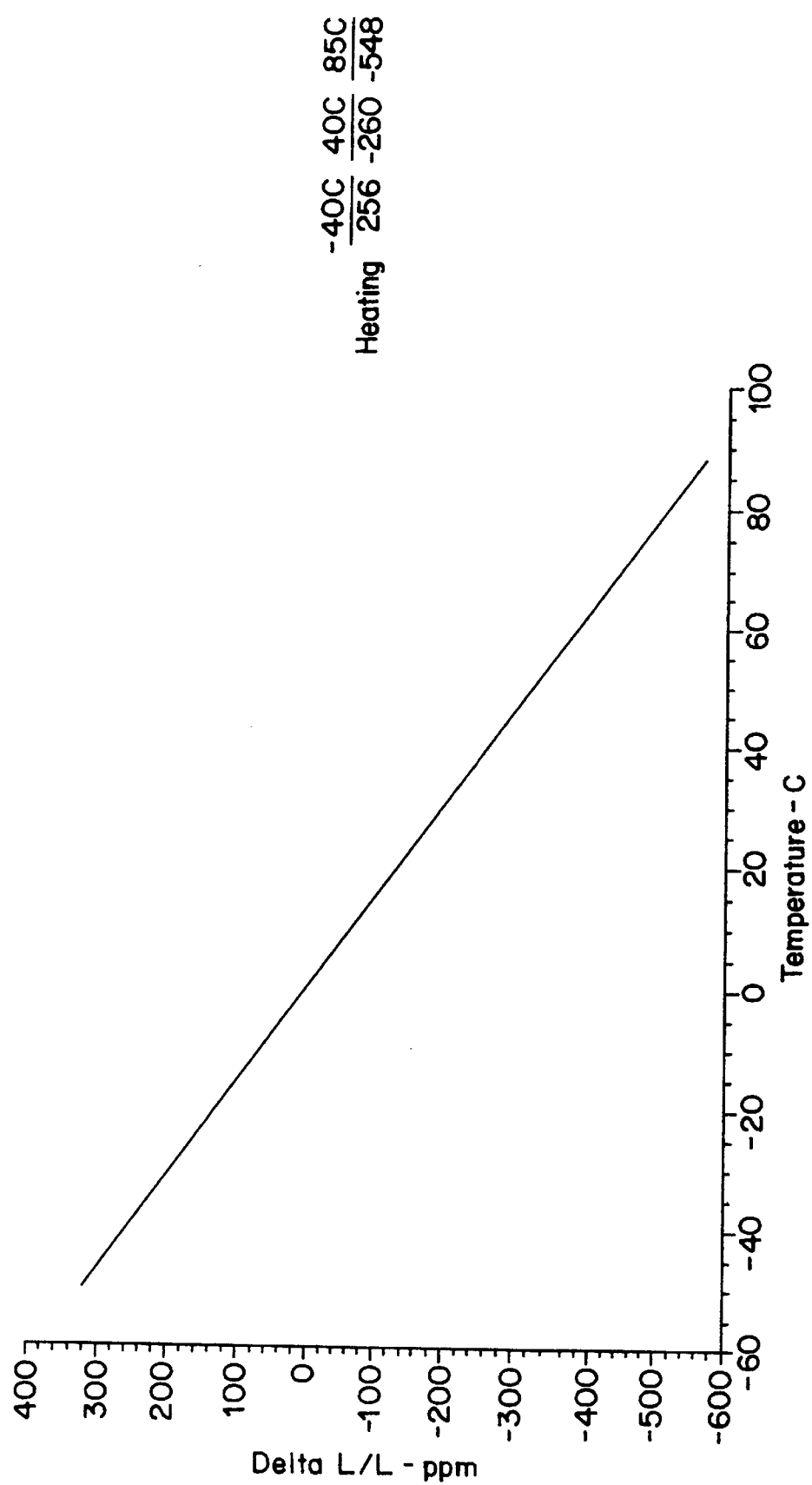
FIG. 19 is a thermal expansion graph of composition KXV.

FIGS. 15a and 15b show the resulting microstructures from 88 KXU with grain size and the microcrack network in 10–15 μm size. The $Al_2TiO_5$ crystals are much larger and sparsely distributed, compared to that of 88 KJX (FIGS. 13a and 13b). After 1300° C.-4 hr. ceram treatment, both KXU and KXV have CTEs in the −70s (20–150° C.) as shown in Table I. FIGS. 16a, 16b, 16c, 16d compare the SEM micrographs of 118 KJX, 88 KSA, 88 KXU, and 88 KXV. Despite the large differences in the scale of microcrack networks, the strengths are approximately the same (4–8 Kpsi) and the CTEs range from −50×$10^{-7}$/°C. for 118 KJX to −70×$10^{-7}$/°C. for 88 KXV, except for the case of 88 KXV cerammed 1300° C./16 hrs. and cycled 2×600° C. with MOR values of about 2,000 psi. Cycling to 800° C. instead of 600° C. increases the strength to 3,600 psi.

With the invention the larger the grain size, the larger the microcracks and the more negative the CTE becomes. Fully crystalline phase assemblage consisting of beta-eucryptite and tielite exists even at ceramming temperatures as low as 1000° C., with the CTE of $-3 \times 10^{-7}/°C$. As discussed earlier, large negative CTEs can be obtained only after some critical ceramming treatment, being 1300° C./4 hrs. or longer for these beta-eucryptite glass-ceramics of the invention. The primary factor controlling CTE is clearly due to the microcracking induced from the anisotropic thermal expansion coefficients of the crystals formed in the glass-ceramic.

In Table 2, CTE data of several beta-eucryptite compositions show an extremely strong dependence on thermal treatment, particularly the top ceram temperature and time. For example, 88 KJX does not show a large negative expansion, derived by the extensive microcrack network, until after 1300° C./4 hrs. After 1300° C./0.5 hr., the CTE is slightly negative, probably entirely due to the inherent beta-eucryptite and tielite phase assemblage without any contribution from the microcrack network. As shown in FIGS. 12a and 12b, already isolated microcracks form after 1100° C./4 hr. treatment. Only after 1300° C./2 hrs., the microcrack network induced expansion becomes significantly negative.

88 KXU and 88 KXV with lower $Al_2TiO_5$ nucleants than that of 88 KJX result in more negative CTE values after ceramming, ranging from −60s after 1300° C./4 hr. to −80s after 1325° C./4 hrs. As shown in FIGS. 15a and 15b and 17a and 17b, the grain sizes and the microcrack networks in 88 KXU and KXV are much larger than that of 88 KJX and KSA shown in FIGS. 13a and 13b and 14a and 14b, respectively.

This CTE data is consistent with the belief that the large negative expansion originates primarily from the microcrack network, whose scale depends on the grain size, which is in turn largely determined by the ceram temperature and time. Clearly, any factors that inhibit the grain growth, such as efficient nucleation and $Al_2TiO_5$ dispersoids, would tend to suppress the microcracking. This is consistent with the anisotropic strain mismatch, that increases linearly with the grain size.

The stoichiometry of the composition also determines the anisotropy of CTE. The stoichiometric beta-eucryptite is the most anisotropic within the solid solution range from 1:1:2 to 1:1:3.

There must be a threshold strain mismatch, and hence critical grain size for a given anisotropy, above which a microcrack network forms. The threshold grain size in 88 KJX (1:1:2.5) appears to be about 7–10 $\mu m$, which is achieved only after 1300° C./4 hrs. Of course, larger grain size obtainable at higher temperatures and longer time leads to larger microcrack size and hence more negative expansion, but also to decomposition of $Al_2TiO_5$.

Another way to increase the grain size without excessive heating is to reduce the nucleation efficiency by lowering the nucleant levels, as was done in the case of 88 KXU and 88 KXV. Thus, ceramming at 1300° C./4 hrs. results in desired CTEs in the range of $-65 \pm 5 \times 10^{-7}/°C$. Stabilization of microcrack network, by thermal cycling to 600–800° C. with 88 KXU and KSV provides the preferred negative expansion substrate.

Tables 4 and 5 list the CTEs and hysteresis (in ppm) for 88 KJX after ceramming, boiling, and thermal cycling 4 times to 800° C. Table 4 shows the effects of separate treatments, whereas that of combining all three treatments are shown in Table 5.

TABLE 4

CTE data of 88 KJX following 1300° C./4 hr. thermal cycling 4x to 800° C., and deionized water boiling treatments

| Ceram (° C./Hr.) | Cycle nxT° C. | H₂O Boil | CTE (25–100° C.) Heat/Cool | Hyst. (ppm) |
|---|---|---|---|---|
| 1300° C./4 | — | — | −45.0/−46.2 | +7 |
| 1300° C./4 | — | — | −46.1/−46.6 | +4 |
| 1300° C./4 | — | — | −45.9/−45.7 | +2 |
| 1300° C./4 | — | — | −48.3/−50.0 | +14 |
|  |  |  | −46.3 ± 1.4/−47.1 ± 2.0 |  |
| 1300° C.14 | 4 × 800° C. | — | −48.6/−46.6 | −11 |
| 1300° C./4 | 4 × 800° C. | — | −48.4/−47.0 | −7 |
| 1300° C./4 | 4 × 800° C. | — | −49.9/−49.7 | −1 |
| 1300° C./4 | 4 × 800° C. | — | −50.1/−50.2 | +1 |
|  |  |  | −49.3 ± 0.9/−48.4 ± 1.8 |  |
| 1300° C./4 | — | 2 h | −43.8/−56.9 | +98 |
| 1300° C./4 | — | 4 h | −47.7/−60.7 | +97 |
| 1300° C./4 | — | 8 h | −40.2/−58.3 | +136 |
| 1300° C./4 | — | 20 h | −40.7/−64.3 | +177 |

TABLE 5

Combined effects of water boiling with thermal cycling to 400° C. to 800° C. on the CTEs of 88 KJX

| Ceram | H₂O Boil | Cycle nxT° C. (post boil) | CTE (25–100° C.) Heat/Cool | Hyst. (ppm) |
|---|---|---|---|---|
| 1300° C./4 | 2 h | 1 × 800° C. | −48.8/49.0 | +1 |
| 1300° C./4 | 4 h | 1 × 800° C. | −53.7/−52.8 | −7 |
| 1300° C./4 | 8 h | 1 × 800° C. | −47.4/−49.1 | +13 |
| 1300° C./4 | 20 h | 1 × 800° C. | −50.9/−53.1 | +17 |
| 1300° C./4 | 4 h | 1 × 400° C. | −55.0/−57.0 | +15 |
| 1300° C./4 | 4 h | 1 × 400° C. | −51.7/−55.0 | +24 |
| 1300° C./4 | 4 h | 1 × 400° C. | −55.8/−57.3 | +12 |
| 1300° C./4 | 4 h | 1 × 400° C. | −54.7/−57.1 | +18 |
|  |  |  | −54.7 ± 1.8/−56.6 ± 1.1 |  |
| 1300° C./4 | 4 h | 2 × 400° C. | −54.0/−55.6 | +12 |
| 1300° C./4 | 4 h | 2 × 400° C. | −52.7/−54.6 | +14 |
| 1300° C./4 | 4 h | 2 × 400° C. | −54.2/−56.2 | +15 |
| 1300° C./4 | 4 h | 2 × 400° C. | −54.4/−56.1 | +13 |
|  |  |  | −53.8 ± 0.8/−55.6 ± 0.7 |  |

Clearly boiling the glass-ceramic substrates in de-ionized water increases the hysteresis over that of as-cerammed specimens, while thermal cycling the glass-ceramic substrate to 800° C. reduces the hysteresis.

It is important that the microcrack network is stable and well behaved over the entire use temperature ranges such as −40° C. to +85° C. as well as 20 to 800° C. It is desirable to have linear heating and cooling coefficients, so as to maintain exact dimensions, particularly in the use temperature range of −40° C. to +85° C.

The negative thermal expansion behavior of the inventive glass-ceramic substrate is believed to be attributed to microcracking of the anisotropic materials. Beta-eucryptite and aluminum titanate ($Al_2TiO_5$) are two of many examples of crystals having anisotropic negative expansion behavior. The hexagonal unit cell expansion coefficients of beta-eucryptite, $\alpha_{\parallel}(\alpha_a$ and $\alpha_b)$ and $\alpha\perp$ ($\alpha_c$) parallel and perpendicular to c-axis, respectively, lead to average linear expansion coefficient of the lattice equal to $-4.0 \times 10^{-7}/°C$. (25–800° C.) as shown in Table 3, in contrast to that of polycrystalline beta-eucryptite glass-ceramics of the invention which range up to $-80 \times 10^{-7}/°C$. or more.

It is believed that the negativity of the microcrack induced CTE for beta-eucryptite glass-ceramic could range up to the maximum of $\alpha_c = -176 \times 10^{-7}/°C$. Apparently, the extent of microcracking controls the magnitude of the aggregate cooling expansion coefficient. The larger the grain size, the larger the microcrack network size, the CTE becomes more biased toward $\alpha_c$.

The invention further includes thermal cycling the glass-ceramic to improve its reliability and stability. It must be noted that the very act of heating to a temperature >400° C., significant amount of crack healing occurs, and hence non-negligible expansion hysteresis takes place. Thus, CTE measurement to about 300° C. or less is required to avoid formation of the hysteresis. Even then unreleased residual stress often cause further microcracking during heating at temperatures as low as 100° C. or above. In the later case, the expansion curve shows a significant jog during the heating and results in a permanent length increase. Release of residual stresses by thermal cycling to 600–800° C. is required to stabilize the microcrack network so as to avoid any dimensional instability and hysteresis during later processing steps at elevated temperatures.

One of the best methods to quantitatively characterize the microcracking-healing behavior is thought to be the sonic resonance test method of measuring Young's modulus. ASTM C623-92 describes the standard test method for measuring sonic modulus for glass and glass-ceramics by sonic resonance techniques.

A glass-ceramic specimen (120×25×3 mm, fine-ground) was suspended by silica fiber and flexural resonance frequencies were measured in an oven.

The microcracking-healing associated with the thermal cycling can be characterized by studying the flexural (average of tensile and compressive) vibration resonance. The greater the extent of microcracking and larger the microcracks, the lower the elastic modulus becomes. The degree of coalescence in the microcrack network may be difficult to visualize through two-dimensional SEM micrographs, the sonic resonance can measure quantitatively the average stiffness of the microcracks material.

At least one cycle to a high temperature equal to the processing or use temperature appears to be necessary to eliminate the hysteresis which manifests itself as permanent length change and/or thermal expansion hysteresis.

Table 6 compares sonic modulus values vs. heat treatments and thermal cycling of 88 KJX and KXV.

TABLE 6

Sonic Young's Modulus vs. Heat Treatment of b-Eucryptite Glass-Ceramics

| Composition | Heat Treatment | Elastic Modulus ($10^6$ psi) 25° C. | 100° C. |
|---|---|---|---|
| 88 KJX | none (Glass) | 12.9 | — |
| | 1100° C./4 hrs. | 16.7 | — |
| | 1300° C./4 hrs. | 7.0 | 6.9 |
| | 1300° C./4 hrs., 1 × 800° C. | 8.1 | 7.9 |
| | 1300° C./4 hrs., 4 × 800° C. | 8.4 | 8.3 |
| 88 KXV | 1000° C./4 hrs. | 15.8 | 15.5 |
| | 1150° C./4 hrs. | 16.3 | 16.0 |
| | 1300° C./4 hrs. | 5.1 | 5.1 |
| | 1300° C./4 hrs., 2 × 600° C. | 5.3 | 5.2 |
| | 1300° C./4 hrs., 2 × 800° C. | 5.9 | 5.8 |
| | 1300° C./16 hrs., 2 × 600° C. | 4.0 | 3.9 |

A differential dilatometer capable of CTE measurement over 100° C. to +200° C. was set up with an environmental chamber having temperatures regulated by controlling electrical heating and liquid nitrogen inputs.

FIG. 15 shows the strong dependence of CTE on the top ceram temperature for KXV. The CTE varies from −44.5, −52.4 to −64.2×$10^{-7}$/°C. after ceramming 4 hrs. at 1290° C., 1300° C., and 1310° C., respectively. Needless to say, an accurate and consistent ceramming temperature control is of critical importance. From such a strong dependence on ceramming, it would be a simple matter to accurate temperature control to tailor CTE values by ceram schedule variations. Initial attempts to increase the top ceram temperature to above 1310° C. resulted in excessive deformation, and discoloring (yellowing) due to decomposition of $Al_2TiO_5$ to rutile and corundum. It was found much simpler to increase the time at 1300° C. for the purpose of obtaining more negative CTEs. It appears that the coarsening of beta-eucryptite grains and the consequent larger microcracks result in more negative thermal expansion coefficient. Ceramming KXV at 1300° C. for 16 hrs. followed by thermal cycling two times at 800° C. resulted in the CTEs in the range of −67±2×$10^{-7}$/°C. over −40° C. to +85° C. (FIG. 16). This is the preferred glass-ceramic substrate of the invention.

As was the case for Young's modulis of microcracked beta-eucryptite glass-ceramics, the strength of the negative expansion glass-ceramic substrate is expected to decrease as the microcracks become larger and more severe. The strength reflects the degree of microcrack damage, and the severity can be determined by the "effective" flaw size as grown by the microcrack coalescence.

Table 7 summarizes the MOR data of the invention. The effects of ceram treatment, thermal cyclings, and boiling in DI water are shown.

TABLE 7

MOR Data of b-Eucryptite Glass-Ceramics (rounded to nearest hundreds)

| Composition | Melt No. | Ceram T° C./Hr. | DI Water Boil (Hr.) | Thermal Cycle (Cycle × T° C.) | MOR (psi) |
|---|---|---|---|---|---|
| 88 KJX | C* | 1300/4 | — | — | 3,900 |
| | 1130+ | 1300/4 | — | — | 4,400 |
| | 1130 | 1300/4 | — | 2 × 800 | 8,100 |
| | 1130 | 1300/4 | 4 | 2 × 800 | 7,500 |
| | 1130 | 1300/4 | 20 | 2 × 800 | 8,600 |
| | 1130 | 1300/16 | — | 2 × 600 | 2,000 |
| | 1146 | 1300/4 | — | — | 3,700 |
| | 1146 | 1300/4 | 20 | — | 5,700 |
| 88 KXU | C | 1300/4 | — | — | 6,400 |
| | 1140 | 1300/4 | — | — | 4,000 |
| 88 KXV | C | 1300/4 | — | — | 5,800 |
| | 1141 | 1300/4 | — | — | 4,500 |
| | 1141 | 1300/4 | — | 2 × 800 | 5,300 |
| | 1141 | 1300/4 | 4 | 2 × 800 | 5,300 |
| | 1141 | 1300/4 | 20 | 2 × 800 | 5,800 |
| | 1141 | 1300/16 | — | 2 × 600 | 2,400 |
| | 1141 | 1300/16 | — | 2 × 800 | 3,600 |
| | 1141 | 1320/4 | — | 2 × 800 | 2,800 |
| | 1141 | 1320/16 | — | 2 × 800 | 2,900 |

*Crucible melt, 2 lb.
+Induction melt, stirred, 10 lb.

Several important observations can be made from the MOR data in Table 7. All compositions show about 4–6 ksi after 1300° C.-4 hr. treatments. When the samples were subsequently cycled twice to 800° C., the strengths increase to 5–8 ksi. 88 KJX samples recover to a higher level (about 8 ksi). 88 KJX samples recover to higher level (about 8 ksi) than 88 KSV, which had coarser grain structure. The longer ceramming for 16 hrs. @ 1300° C. significantly reduced the MOR to 2–3 ksi, even after cycling to 600° C. When cycled to 800° C. twice, the strength recovers to 3.5–4.0 ksi. 88

KXV cerammed at 1300° C./16 hrs. with 2–800° C. cycling provided consistently CTEs of −67 ±2×10$^{-7}$/°C. over −40° C. to +85° C., which is the preferred substrates of the invention.

As mentioned earlier the boiling water treatments, placing the substrates in boiling DI water, increased the negativity of the CTEs, along with the hysteresis. In order to reduce the hysteresis, the boiled specimens were cycled to 800° C. After the cycling to 800° C., the CTE and MOR values were about the same as those without the water boiling.

The optimal glass-ceramic substrate of the invention has a CTE of −65 to −70×10$^{-7}$/°C. with no appreciable hysteresis over −40° to +85° C., with an optimal ceramming schedule to minimize substrate warpage to less than 100 μm over 2" length, and has minimal dimensional instability, particularly under damp heat (85° C./85% RH) conditions for at least 2000 hrs. A rather wide range of CTEs can be obtained for beta-eucryptite glass-ceramic substrates through variations in composition, nucleant level, and thermal treatments.

Stabilization of the microcrack network of beta-eucryptite glass-ceramic substrates after ceramming near 1300° C.-4 hrs. can be accomplished by subsequent thermal cycling to 600–800° C. one or more times in order to eliminate later CTE hysteresis at temperatures up to 700–800° C.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed:

1. A glass ceramic article comprised of a negative thermal expansion glass ceramic comprised of 8.5–11.5 wt %$Li_2O$, 34–42 wt %$Al_2O_3$, 42–55 wt %$SiO_2$, 3.2–5.0 wt %$TiO_2$, 0–2 wt %$B_2O_3$, 0–3 wt %$P_2O_5$, wherein the glass-ceramic article has a negative thermal expansion coefficient in the range from −20×10$^{-7}$/°C. to −100×10$^{-7}$/°C. over the temperature range of −40° C. to +85° C.

2. A negative thermal expansion glass-ceramic consisting essentially of 8.5–11.5 wt %$Li_2O$, 34–42 wt %$Al_2O_3$, 42–55 wt %$SiO_2$, 3.2–5.0 wt % $TiO_2$, 0.9–2 wt %$B_2O_3$, 0–3wt %$P_2O_3$.

3. A glass ceramic aiticle comprised of a negative thermal expansion glass-ceramic consisting essentially of 8.5–11.5wt %$Li_2O$, 34–42 wt % $Al_2O_3$, 42–55 wt % $SiO_2$, 3.2–5.0 wt %$TiO_2$, 0–2 wt % $B_2O_3$, 0–3 wt %$P_2O_5$, said article being characterized by a microcracked structure, wherein said glass ceramic article has a negative thermal expansion coefficient in the range from −10×10$^{-7}$/°C. to −100×10$^{-7}$/°C. over the temperature range of −40° C. to +85° C.

4. A rigid glass-ceramic article, said article comprised of a beta-eucryptite primary crystal phase, said glass-ceramic article characterized by a microcracked structure wherein the glass-ceramic article has a negative thermal expansion coefficient in the range from −20×10$^{-7}$/°C. to −100×10$^{-7}$/°C. over the temperature range of −40° C. to +85° C.

* * * * *

UNITED STATES PATENT AND TRADEMARK OFFICE
CERTIFICATE OF CORRECTION

PATENT NO.   : 6,465,380 B1
DATED        : October 15, 2002
INVENTOR(S)  : Beall, George et al.

It is certified that error appears in the above-identified patent and that said Letters Patent is hereby corrected as shown below:

Column 20,
Line 15, should read -- 3.   A glass ceramic article comprised of a negative thermal --

Signed and Sealed this

Thirteenth Day of May, 2003

JAMES E. ROGAN
*Director of the United States Patent and Trademark Office*